United States Patent
Ishida et al.

(10) Patent No.: US 7,304,651 B2
(45) Date of Patent: Dec. 4, 2007

(54) RENDERING DEVICE FOR GENERATING A DISPLAY IMAGE FOR DRIVE ASSISTANCE

(75) Inventors: Akira Ishida, Sakai (JP); Atsushi Iisaka, Katano (JP); Takashi Yoshida, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1112 days.

(21) Appl. No.: 09/861,548

(22) Filed: May 22, 2001

(65) Prior Publication Data

US 2001/0048446 A1 Dec. 6, 2001

(30) Foreign Application Priority Data

May 24, 2000 (JP) ............... 2000-152381

(51) Int. Cl.
- G09G 5/00 (2006.01)
- B60Q 1/00 (2006.01)
- G09F 9/00 (2006.01)
- G08G 1/00 (2006.01)
- G08G 1/017 (2006.01)
- G08G 1/054 (2006.01)
- H04N 7/18 (2006.01)
- H04N 9/47 (2006.01)

(52) U.S. Cl. .......... 345/629; 340/461; 340/901; 340/937; 348/148

(58) Field of Classification Search .......... 340/461, 340/937, 901; 348/148; 345/629
See application file for complete search history.

(56) References Cited

U.S. PATENT DOCUMENTS

| | | | |
|---|---|---|---|
| 5,670,935 A * | 9/1997 | Schofield et al. | 340/461 |
| 5,680,123 A * | 10/1997 | Lee | 340/937 |
| 5,742,141 A | 4/1998 | Czekaj | |
| 5,949,331 A * | 9/1999 | Schofield et al. | 340/461 |
| 5,995,903 A * | 11/1999 | Smith et al. | 701/211 |
| 6,049,171 A * | 4/2000 | Stam et al. | 315/82 |
| 6,075,559 A * | 6/2000 | Harada | 348/148 |
| 6,184,781 B1 * | 2/2001 | Ramakesavan | 340/435 |
| 6,218,960 B1 * | 4/2001 | Ishikawa et al. | 340/901 |
| 6,366,221 B1 * | 4/2002 | Iisaka et al. | 340/932.2 |
| 6,369,701 B1 * | 4/2002 | Yoshida et al. | 340/435 |
| 6,421,081 B1 * | 7/2002 | Markus | 348/148 |
| 6,424,273 B1 * | 7/2002 | Gutta et al. | 340/937 |
| 6,463,363 B1 * | 10/2002 | Okuda | 701/1 |

(Continued)

FOREIGN PATENT DOCUMENTS

| JP | 07-248821 | 9/1995 |
|---|---|---|
| JP | 8-48198 | 2/1996 |

(Continued)

*Primary Examiner*—Jin-Cheng Wang
(74) *Attorney, Agent, or Firm*—Wenderoth, Lind & Ponack, L.L.P.

(57) ABSTRACT

In a rendering device Urnd1, a processor 1 receives a front-left image Sfl and a front-right image Sfr at regular intervals, and therefrom, cuts out a partial front-left image and a partial front-right image for overlay onto a mask image. The processor 1 then overlays, with a predetermined timing, any one of vehicle model images varying in size onto the mask image. Here, the vehicle model image is overlaid in such manner as to create a moving picture as if the vehicle model image is moving forward. With such vehicle model image, a driver of a vehicle can instantaneously recognize that a drive assistant device is now showing the front side of the vehicle.

12 Claims, 31 Drawing Sheets

U.S. PATENT DOCUMENTS

| | | | |
|---|---|---|---|
| 6,476,731 B1 * | 11/2002 | Miki et al. | 340/937 |
| 6,476,855 B1 * | 11/2002 | Yamamoto | 348/148 |
| 6,483,429 B1 * | 11/2002 | Yasui et al. | 340/435 |
| 6,507,025 B1 * | 1/2003 | Verbinski et al. | 250/358.1 |
| 6,515,597 B1 * | 2/2003 | Wada et al. | 340/988 |
| 6,539,288 B2 * | 3/2003 | Ishida et al. | 701/1 |
| 6,546,118 B1 | 4/2003 | Iisaka et al. | |

FOREIGN PATENT DOCUMENTS

| | | |
|---|---|---|
| JP | 08-050699 | 2/1996 |
| JP | 08-050899 | 2/1996 |
| JP | 09-035196 | 2/1997 |
| JP | 10-175482 | 6/1998 |
| JP | 10-257482 | 9/1998 |
| JP | 10-262240 | 9/1998 |
| JP | 11-055656 | 2/1999 |
| JP | 11-203445 | 7/1999 |
| JP | 11-338074 | 12/1999 |

* cited by examiner

F I G. 3
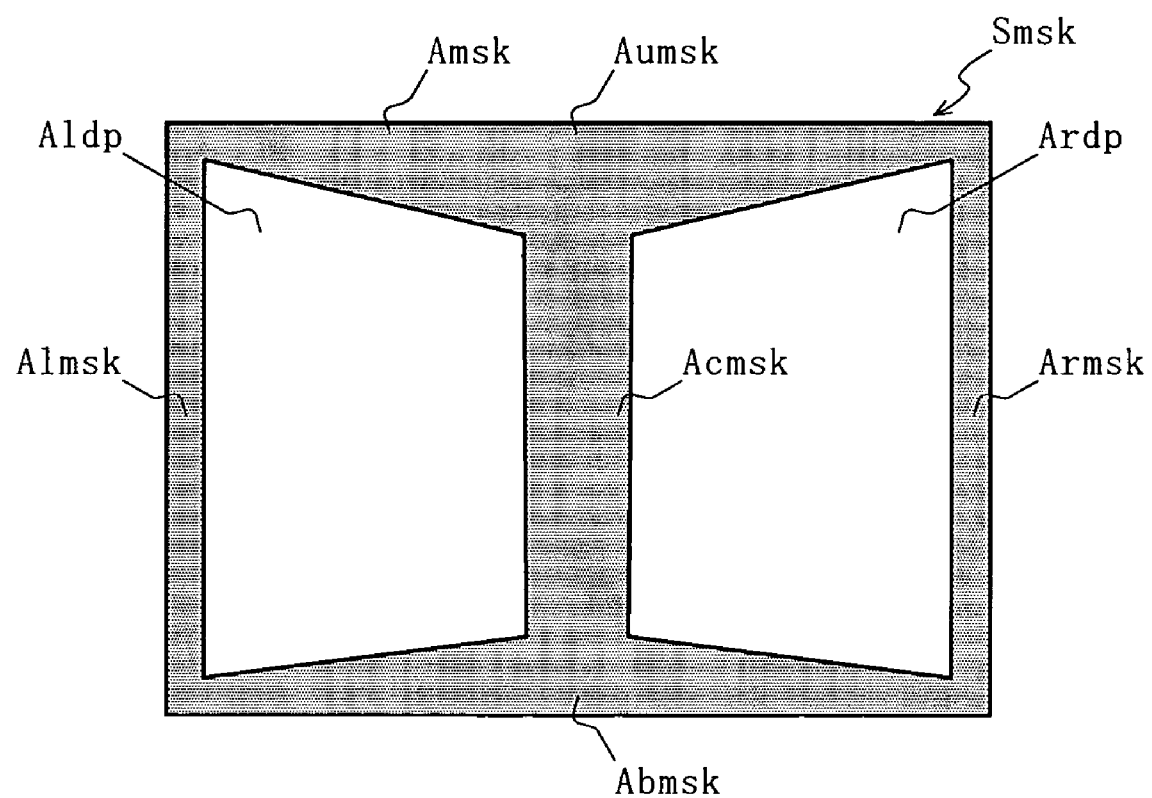

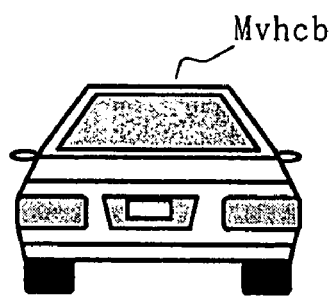
Fig. 4 ( a )
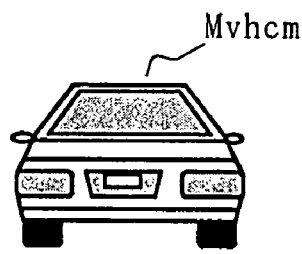
Fig. 4 ( b )
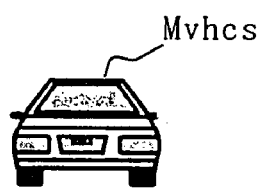
Fig. 4 ( c )
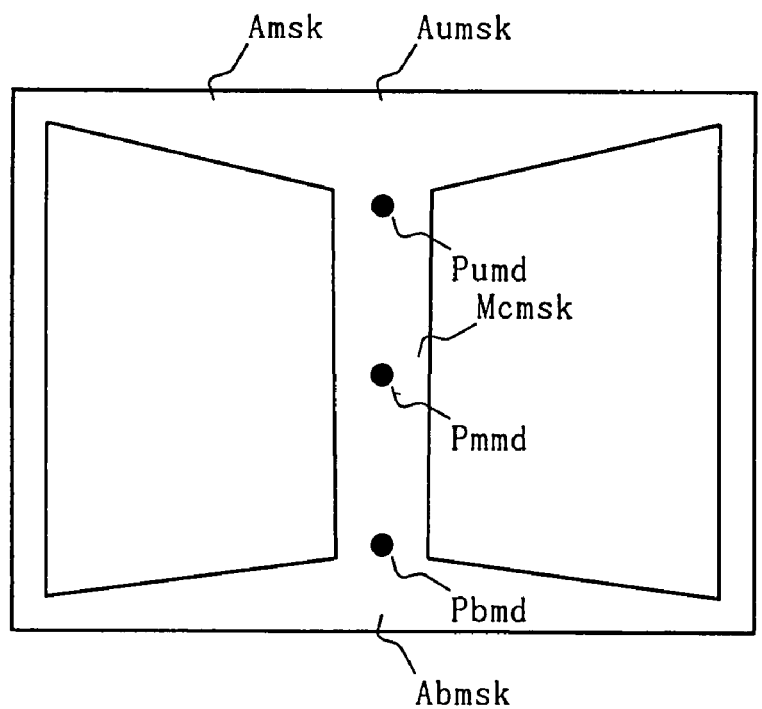
Fig. 4 ( d )

Fig. 13 ( a )
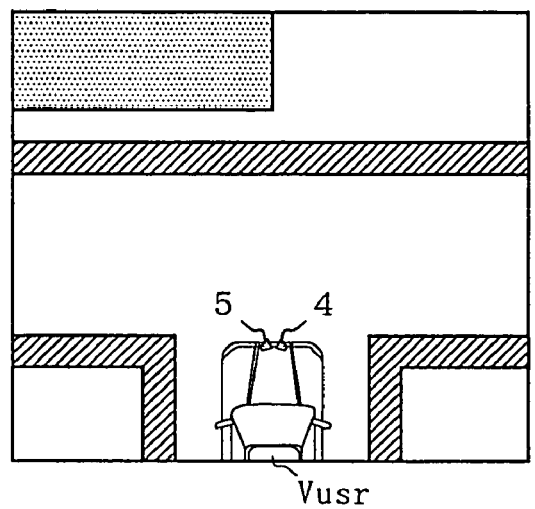
Fig. 13 ( b )
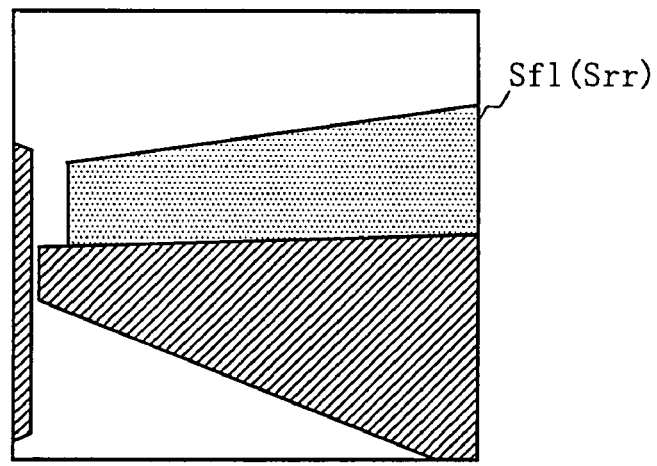
Sfl(Srr)
Fig. 13 ( c )
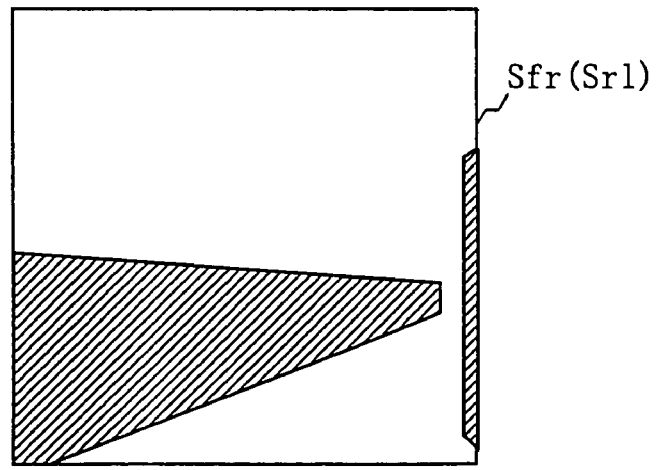
Sfr(Srl)

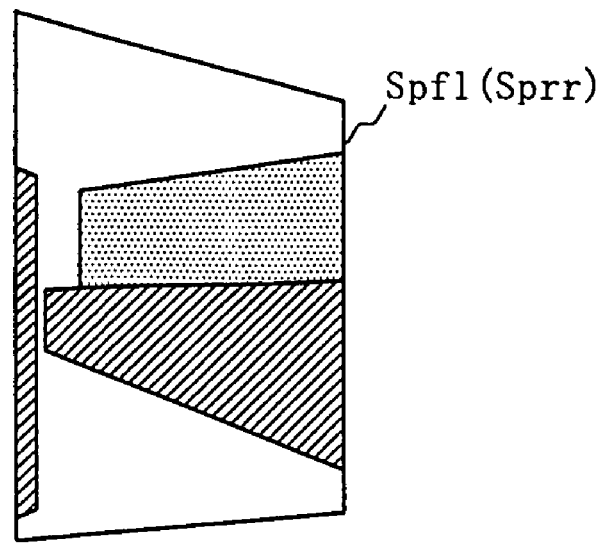
Fig. 14 ( a )
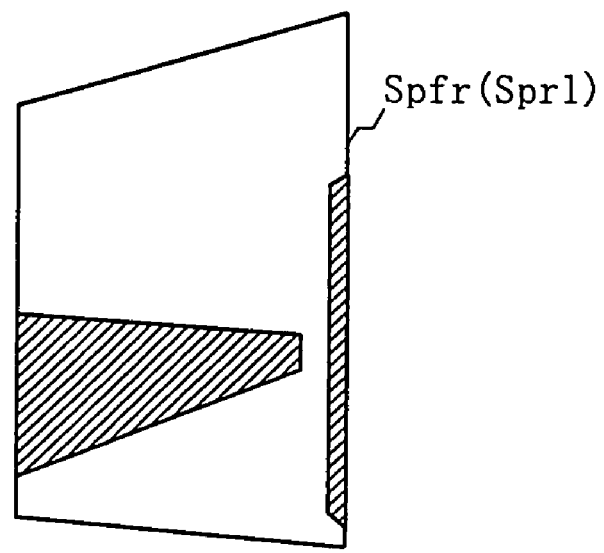
Fig. 14 ( b )

Fig. 32 ( a )
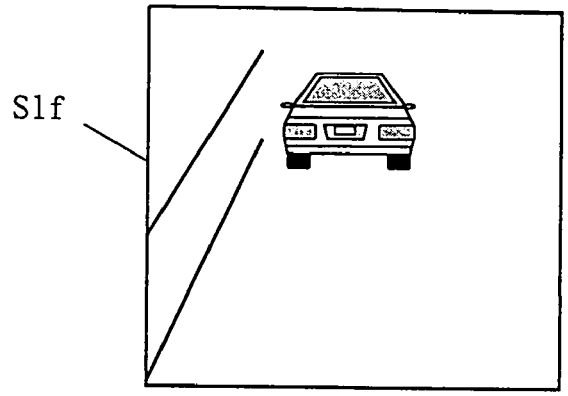
Fig. 32 ( b )
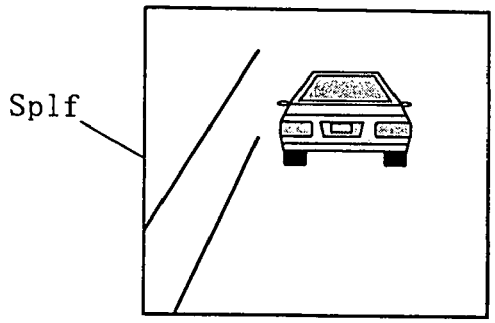
Fig. 32 ( c )
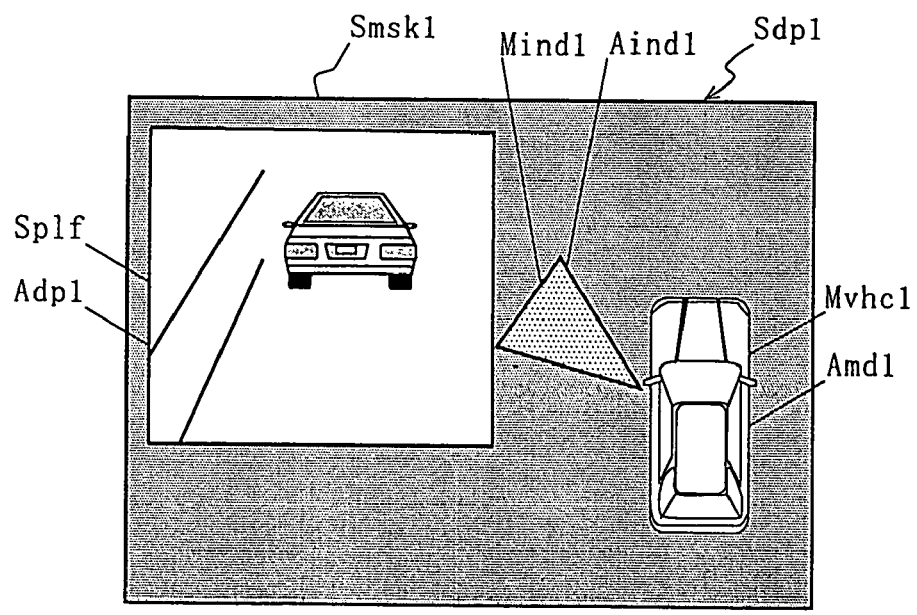

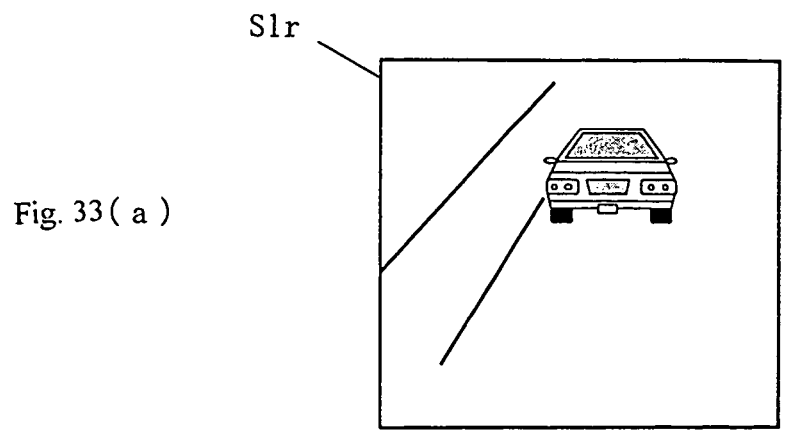
Fig. 33 ( a )
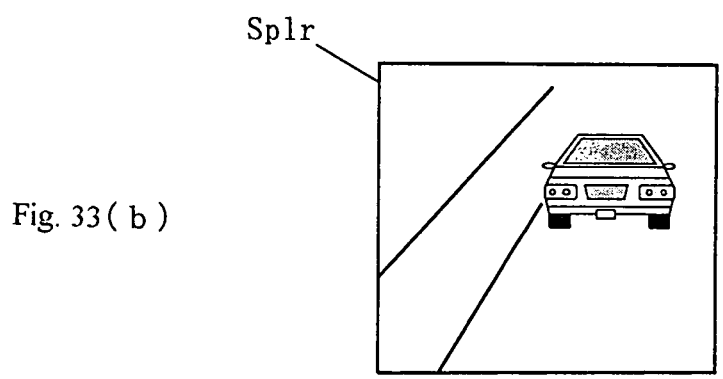
Fig. 33 ( b )
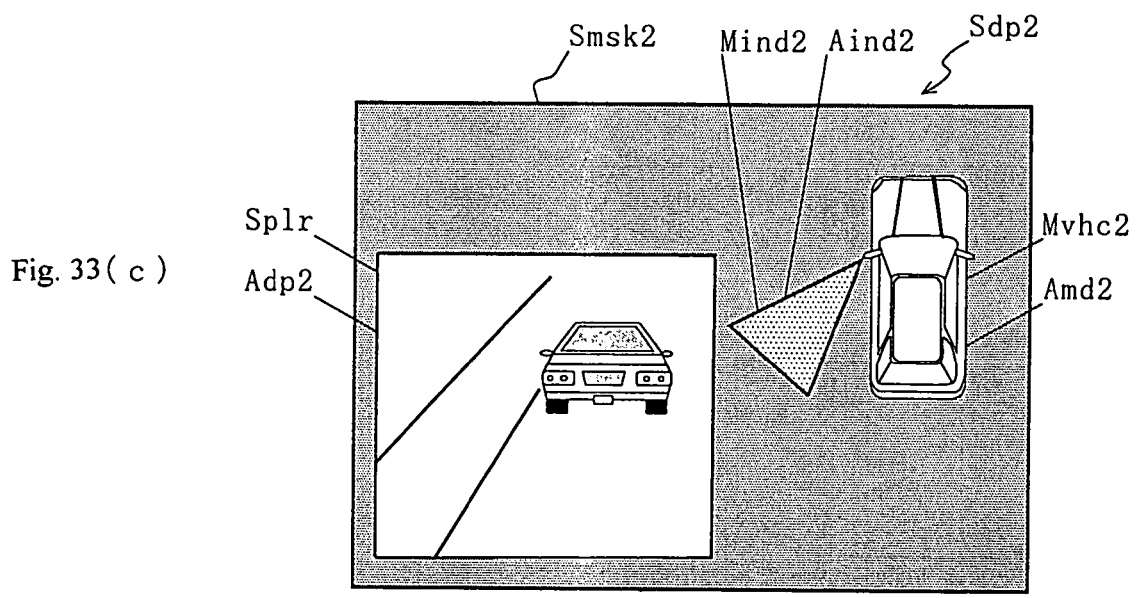
Fig. 33 ( c )

RENDERING DEVICE FOR GENERATING A DISPLAY IMAGE FOR DRIVE ASSISTANCE

BACKGROUND OF THE INVENTION

1. Field of the Invention

The present invention relates to rendering devices and, more specifically, to a rendering device for processing images of around a vehicle captured by image capture devices, and generating an image for display on a display device.

2. Description of the Background Art

Exemplified for such rendering device is a monitor device disclosed in Japanese Patent Laid-Open Publication No. 11-338074 (99-338074). FIG. 35 is a block diagram showing the entire structure of the monitor device, including a first CCD camera 1001, a second CCD camera 1002, a control unit 1003, and a display unit 1004.

The first CCD camera 1001 is placed at the front-left corner of the vehicle, and captures an image of the front-left area ahead of the vehicle towards the heading direction thereof. Thus captured image is referred to as left-side image Scls. Similarly, the second CCD camera 1002 is placed at the front-right corner of the vehicle, and an image captured thereby is referred to as right-side image Scrs.

The control unit 1003 includes, roughly, an image generation device 1005, and an image overlay device 1006. The image generation device 1005 generates a trimming image Sctr and a vehicle image Scve. Here, as shown in FIG. 36, the trimming image Sctr is an image masked by a masking region Acmsk so that a left-side display region Acldp and a right-side display region Acrdp are formed on a display screen of the display device 1004. The vehicle image Scve represents the vehicle viewed from behind, and overlaid on the center of the trimming image Sctr as shown in FIG. 36.

Onto the resultant image having the vehicle image Scve overlaid on the trimming image Sctr, the image overlay device 1006 overlays the left-side image Scls and the right-side image Scrs captured by the first and second CCD cameras 1001 and 1002, respectively. Specifically, the left-side image Scls is overlaid onto the left-side display region Acldp, and the right-side image Scrs is overlaid onto the right-side display region Acrdp. The resultant image is a display image Scdp, which is displayed on the display device 1004. In the display image Scdp, the vehicle image Scve is located between the left- and right-side images Scls and Scrs, and thus the driver can appropriately recognize which image shows which side of the vehicle.

As such, the above monitor device carries two CCD cameras 1001 and 1002, but those cover only the front part of the vehicle. Recently, such CCD cameras have become commonly placed at right and left, and front and rear of the vehicle to capture images of thoroughly around the vehicle. If this is the case, the resultant image generated by simply overlaying the vehicle image Scve between the left- and right-side images Scls and Scrs may confuse the driver. That is, the driver cannot instantaneously recognize from which direction that the image he/she is seeing, covers. More specifically, assume a case that two CCD cameras are placed at the front side of the vehicle, and two more at the rear side thereof. The driver thus can see images covering both the front and rear sides of the vehicle, but cannot instantaneously tell which side of the vehicle he/she is now seeing through the image.

SUMMARY OF THE INVENTION

Therefore, an object of the present invention is to provide a rendering device, a display image generated thereby making a driver instantaneously recognize which side of his/her vehicle is now displayed by a drive assistant device.

The present invention has the following features to attain the object above.

An aspect of the present invention is directed to a rendering device for generating a display image for drive assistance. The device comprises: a reception part for receiving, from an image capture device mounted in the vehicle, a surrounding image which covers an area surrounding around the vehicle; and a first image overlay part for overlaying, onto the surrounding image, an indicator image to indicate which direction the surrounding image received from the reception part is covering, and generating an image for display.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram schematically showing a mask region Amsk represented by mask data Dmsk of FIG. 2;

FIGS. 4A, 4B, and 4C are diagrams schematically showing vehicle model images Mvhcb, Mvhcm, and Mvhcs represented, respectively, by three vehicle model data Dmdl, Dmdm, and Dmds of FIG. 2;

FIG. 4D is a diagram showing an upper point Pumd, a middle point Pmmd, and a lower point Pbmd positionally defined in the mask region Amsk of FIG, 3;

FIG. 13A is a drawing showing a case where the vehicle Vusr encounters an intersection;

FIGS. 13B and 13C are diagrams exemplarily showing, respectively, a front-left image Sfl and a front-right image Sfr received in step S13 in FIG. 7;

FIGS. 14A and 14B are diagrams exemplarily showing, respectively, a partial front-left image Spfl and a partial front-right image Spfr generated in step S14 in FIG. 7;

FIGS. 32A, 32B, and 32C are diagrams exemplarily showing, respectively, a left-front image Slf, a partial left-front image Splf, and a first display side image Sdp1 generated in the processing in FIG. 30;

FIGS. 33A to 33C are diagrams exemplarily showing, respectively, a left-rear image Slr, a partial left-rear image Splr, and a second display side image Sdp2 generated in the processing in FIG. 31;

DESCRIPTION OF THE PREFERRED EMBODIMENTS

Figure 1:
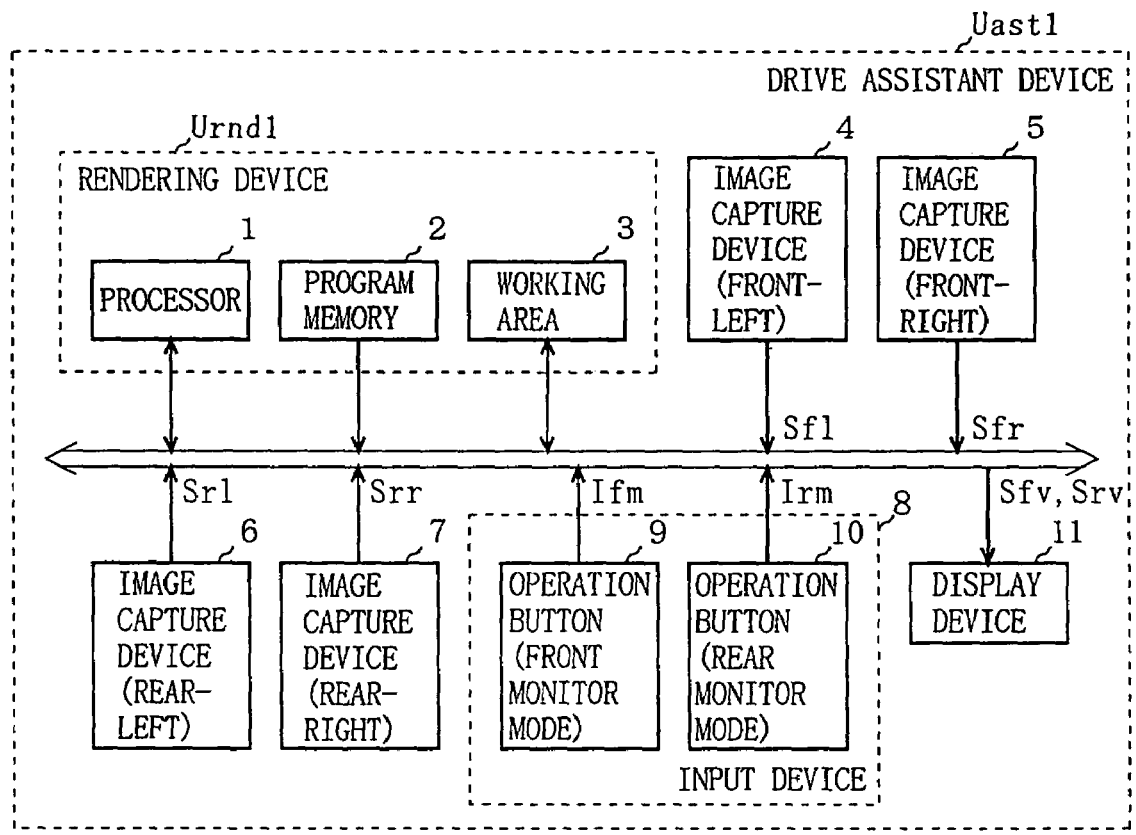
FIG. 1 is a block diagram showing the structure of a drive assistant device Uast1 having incorporated therein a rendering device Urnd1 according to a first embodiment of the present invention.

FIG. 1 is a block diagram showing the hardware structure of a rendering device Urnd1 according to a first embodiment of the present invention. In FIG. 1, the rendering device Urnd1 generates images for drive assistance (a display front image Sfv and a display rear image Srv, which will be described later) for display on a display device 11. The rendering device Urnd1 includes a processor 1, program memory 2, and a working area 3.

Figure 2:
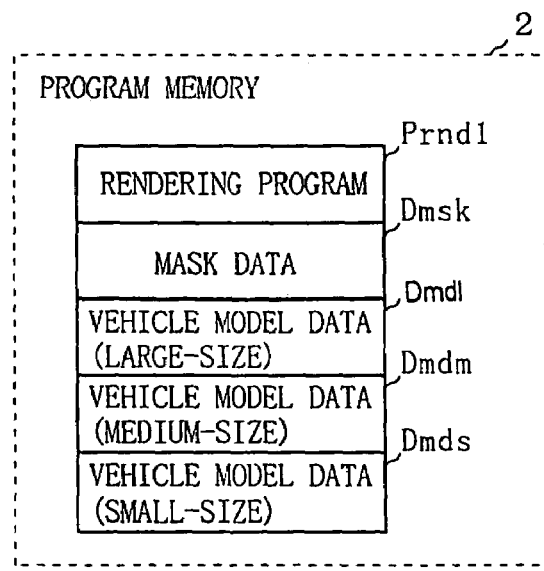
FIG. 2 is a diagram showing that program memory 2 of FIG. 1 stores a rendering program Prnd1 and any other necessary data therein.

The program memory 2 is typified by ROM (Read Only Memory), and as shown in FIG. 2, stores a rendering program Prnd1. The program memory 2 also includes mask data Dmsk, and vehicle model data Dmdl, Dmdm, and Dmds, all of which are needed at time of executing the rendering program Prnd1.

The mask data Dmsk represents an image of such mask region Amsk as shown in FIG. 3 by a hatched area (hereinafter, referred to as mask image Smsk). In detail, the mask region Amsk is composed of an upper mask region Aumsk, a lower mask region Abmsk, a center mask region Acmsk, a left-side mask region Almsk, and a right-side mask region Armsk. Those mask regions mask each corresponding region on the screen of the display device 11. Specifically, the corresponding regions to the right- and left-side mask regions Almsk and Armsk are those formed along the left and right sides of the screen, respectively. Here, regions unmasked by the mask region Amsk are the left- and right-side display region Aldp and Ardp with some distance therebetween.

The vehicle model data Dmdl represents an image of a vehicle viewed from behind, the size of which is relatively large as shown in FIG. 4A. Such image is now referred to as a vehicle model image Mvhcb. Similarly, the vehicle model data Dmdm represents a vehicle model image Mvhcm (see FIG. 4B), which is smaller than the vehicle model image Mvhcb but larger than a vehicle model image Mvhcs (see FIG. 4C) represented by the vehicle model data Dmds.

Such vehicle model images Mvhcb, Mvhcm, and Mvhcs are each overlaid on the mask region Amsk (the manner is described later). More specifically, referring to FIG. 4D, the vehicle model image Mvhcs is placed on an upper point Pumd, which is found in the center mask region Acmsk closer to the upper mask region Aumsk. The vehicle model image Mvhcm is placed on a middle point Pmmd, which is also in the center region Acmsk but lower than the upper point Pumd. Also, the vehicle model image Mvhcb is placed on a lower point Pbmd, which is in the center mask region Acmsk closer to the lower mask region Abmsk and lower than the middle point Pmmd. These vehicle model images Mvhcb, Mvhcm, and Mvhcs are exemplified for an indicator image in claims.

Refer back to FIG. 1. The working area 3 is typified by RAM (Random Access Memory), and used when the processor 1 executes the rendering program Prnd1. The rendering device Urnd1 in the above structure is typically included in a drive assistant device Uast1, and the processor 1 therein is communicably connected to image capture devices 4 to 7, an input device 8, and the display device 11. Such drive assistant device Uast1 is mounted in a vehicle Vusr of FIG. 5. The image capture device 4 takes charge of the front-left side of the vehicle Vusr, the image capture device 5 of the front-right side, the image capture device 6 of the rear-left side, and the image capture device 7 of the rear-right side.

Figure 5:
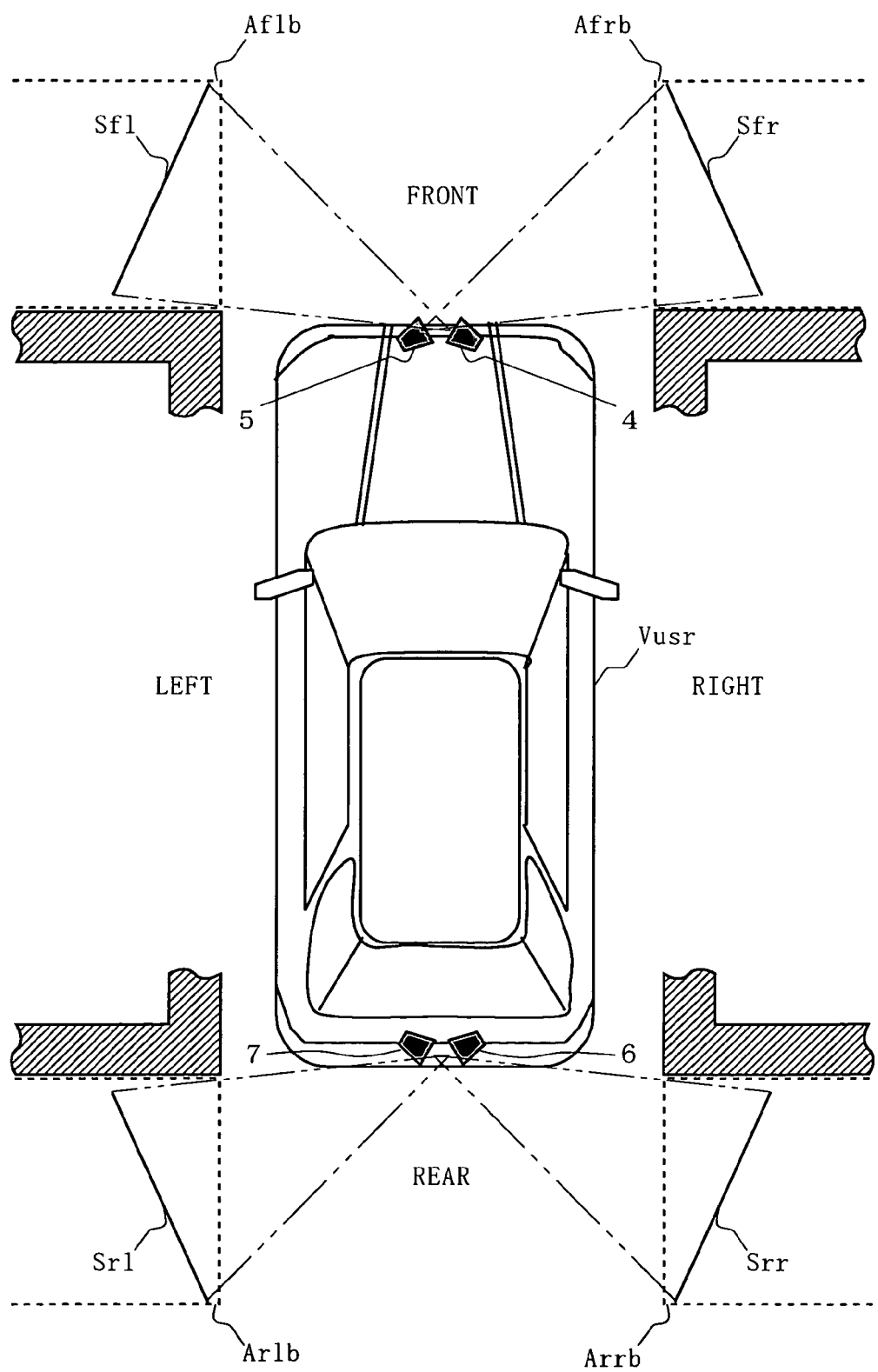
FIG. 5 is a schematic diagram exemplarily showing where image capture devices 4 to 7 of FIG. 1 are placed in a vehicle Vusr.

As shown in FIG. 5, the image capture devices 4 and 5 are both placed on the front side of the vehicle Vusr. To be more specific, assuming that the vehicle Vusr encounters an intersection where the driver has some difficulty in recognizing what is going on on the road he/she is going to cross. This may happen when walls, for example, block the driver's view. Due to such obstacles (hatched area), the front-left and front-right areas ahead of the vehicle Vusr partially become the driver's blind regions. In this embodiment, such blind region observed in the front-left area ahead of the vehicle Vusr is referred to as a blind region Alfb, which is indicated by a dotted line in FIG. 5. Similarly, the blind region observed in the front-right area ahead of the vehicle Vusr is referred to as a blind region Afrb. As for the image capture device 4, a lens thereof is so placed as to direct to the blind region Aflb, and captures an image thereof as a front-left image Sfl. As for the image capture device 5, a lens thereof is so placed as to direct to the blind region Afrb, and captures an image thereof as a front-right image Sfr.

Similarly, when the vehicle Vusr moves backward to exit from a parking space to a road, the driver's view is often blocked by obstacles. The driver thus may also have difficulty in recognizing what is going on on the road he/she is going to cross. Due to such obstacles, the rear-left and rear-right areas, with respect to the driver at the driver's seat, partially become the driver's blind regions. In this embodiment, such blind regions observed in the rear-left and rear-right areas are referred to as blind regions Arlb and Arrb, respectively. The image capture devices 6 and 7 are placed on the rear side of the vehicle Vusr so that images of those blind regions Arlb and Arrb are captured as a rear-left image Srl and a rear-right image Srr. Those front-left image Sfl, front-right image Sfr, rear-left image Srl, and the rear-right image Srr are all exemplified for a surrounding image, and based thereon, the display front image Sfv and display rear image Srv are generated. Note that, the number of image capture devices provided to the drive assistant device Uastl is not limited to those four image capture devices 4 to 7, and may be more to cover areas on the right and left of the vehicle Vusr.

In FIG. 1, the input device 8 at least includes operation buttons 9 and 10. Pushing the operation button 9 starts a front monitor mode in response to an instruction signal Ifm (step S2 in FIG. 6), and pushing the operation button 10 starts a rear monitor mode in response to an instruction signal Irm (step S4 in FIG. 6). Typically, the operation button 9 is pushed by the driver when the vehicle Vusr (see FIG. 5) encounters any intersection or moves forward to exit from a parking space. In response to the push, the input device 8 generates an instruction signal Ifm for transmission to the processor 1 so as to instruct the processor 1 to start the front monitor mode. On the other hand, the driver pushes the operation button 10 immediately before moving the vehicle Vusr backward. In response to the push, the input device 8 generates an instruction signal Irm for transmission to the processor 1 so as to instruct the processor 1 to start the rear monitor mode.

Here, in FIG. 1, the display device 11 is typically a liquid crystal display, and displays on its screen the display front and rear images Sfv and Srv generated by the processor 1.

Described next is the operation of such drive assistant device Uastl with reference to FIGS. 6 to 12 for flowcharts. Once the drive assistant device Uastl is turned ON, the processor 1 starts executing the rendering program Prnd1, and at the same time, reads the mask data Dmsk, and the vehicle model data Dmdl, Dmdm, and Dmds to the working area 3.

Figure 6:
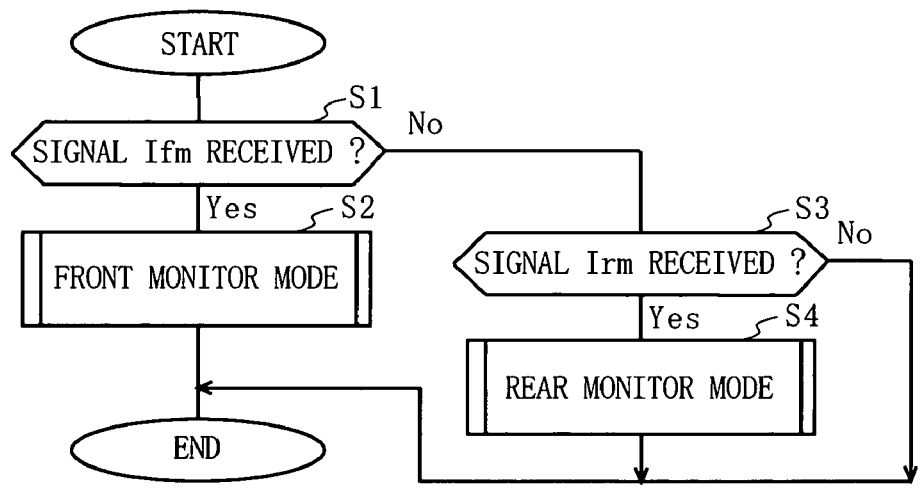
FIG. 6 is a main flowchart showing the operation of the drive assistant device Uast1 of FIG. 1.

In response to the received signal, the processor 1 starts the processing of the main flowchart in FIG. 6. The processor 1 first determines whether the received signal is the instruction signal Ifm (step S1). If determined Yes, the processor 1 executes the front monitor mode (step S2), otherwise the procedure goes to step S3.

Figure 8:
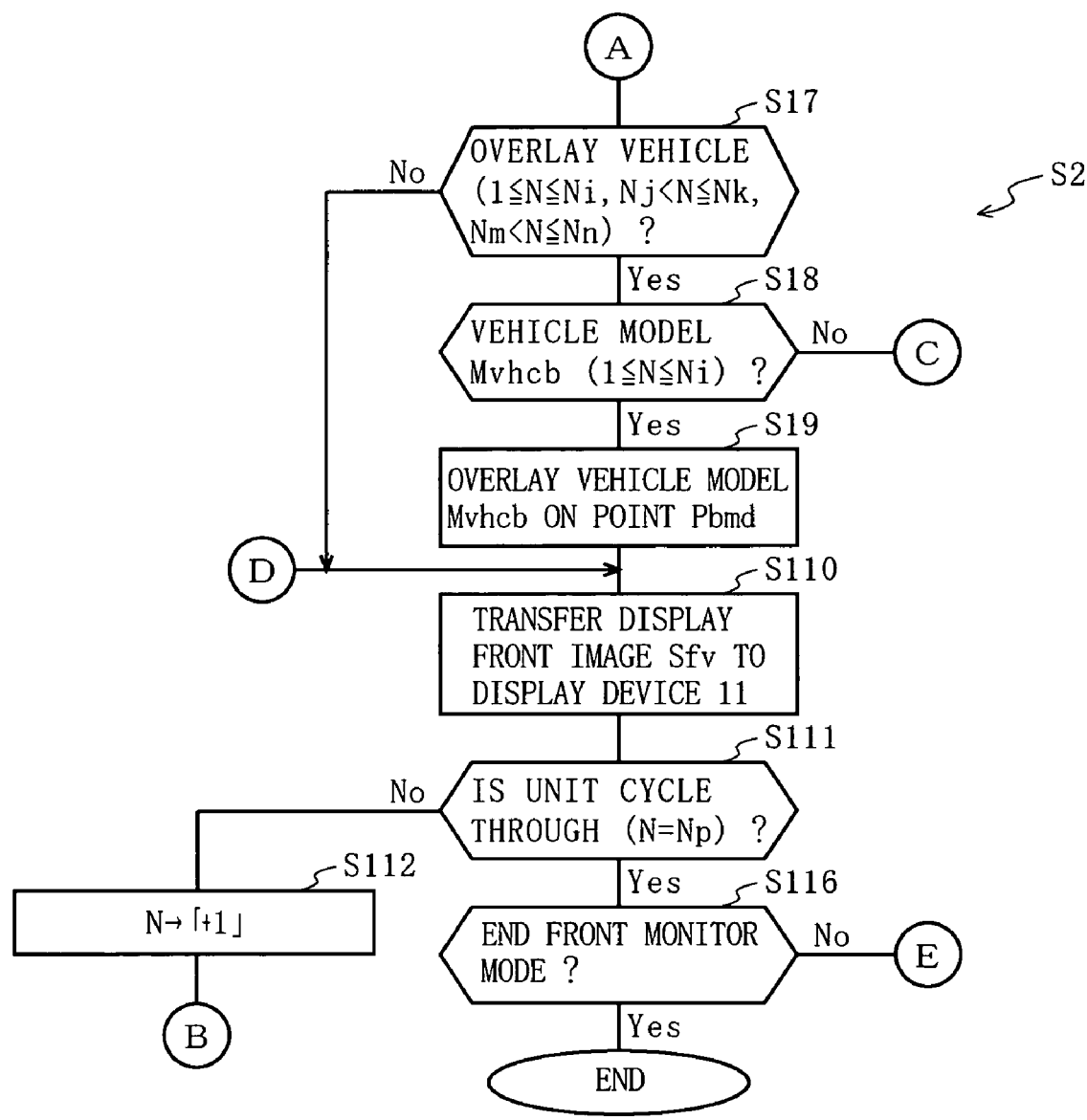
FIG. 8 is a flowchart showing the second part of the detailed procedure in step S2 in FIG. 6.
Figure 9:
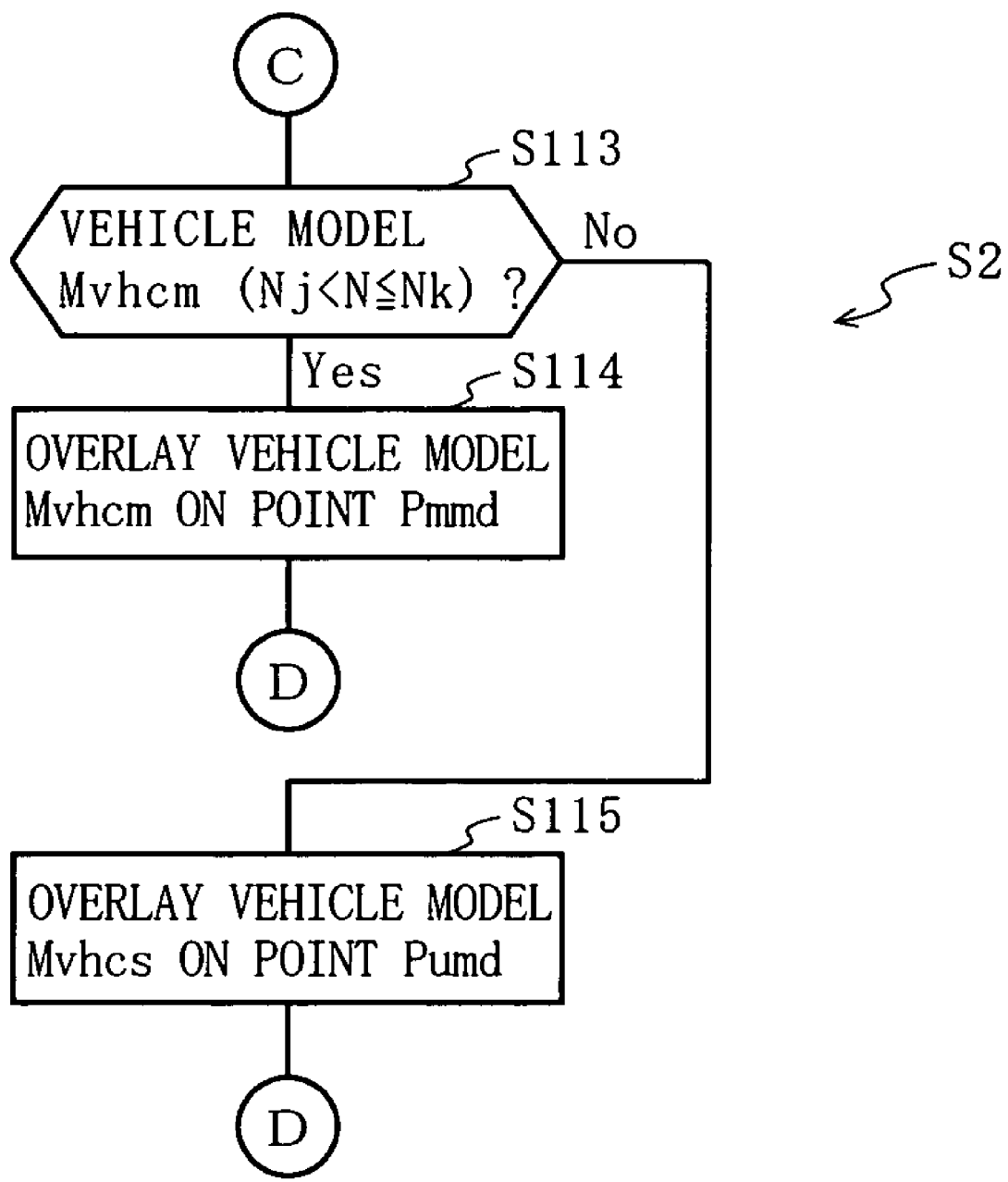
FIG. 9 is a flowchart showing the last part of the detailed procedure in step S2 in FIG. 6.

As shown in FIG. 13A, assume that the vehicle Vusr encounters an intersection. In this case, the driver pushes the operation button 9, and the input device 8 responsively transmits the instruction signal Ifm to the processor 1. The processor 1 then determines that the instruction signal Ifm has been received in step S1, and thus carries out the front monitor mode. In the front monitor mode, the display front image Sfv is generated for assisting the driver to drive, and the detailed procedure thereof is shown in FIGS. 7 to 9.

Figure 7:
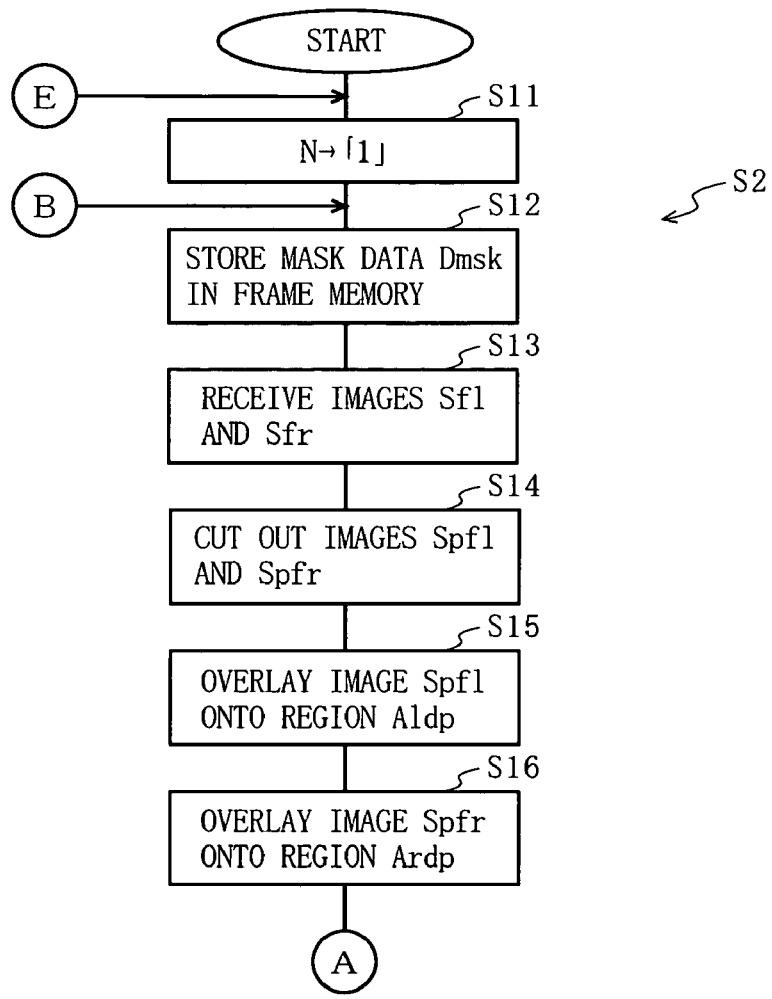
FIG. 7 is a flowchart showing the first part of the detailed procedure in step S2 in FIG. 6.

In FIG. 7, the processor 1 sets a value N of a counter (not shown) to 1, which is an initial value (step S11). Here, the counter value N is incremented by 1 every time the display front image Sfv is generated. Here, the counter value N can be up to Np (e.g., 30), and in sequence of 1 to the upper limit Np, indicates a position of the currently-generated display front image Sfv. After step S11 is through, the processor 1 stores the mask data Dmsk into frame memory (not shown) reserved in the working area 3 (step S12). After step S12 is through, generated on the frame memory is the mask image Smsk (see FIG. 3) only.

The processor 1 then instructs the image capture devices 4 and 5 on the front side of the vehicle Vusr to capture the front-left image Sfl and the front-right image Sfr, respectively. The image capture device 4 responsively captures such front-left image Sfl as shown in FIG. 13B, and stores it in the working area 3. The image capture device 5 also responsively captures such front-right image Sfr as shown in FIG. 13C, and stores it in the working area 3. In such manner, the processor 1 receives the front-left image Sfl and the front-right image Sfr for the vehicle Vusr (step S13).

The processor 1 then carries out cutout processing (step S14). More specifically, from the front-left image Sfl received in step S13, the processor 1 cuts out such partial front-left image Spfl as shown in FIG. 14A. Here, the partial front-left image Spfl is a part overlaid onto the left-side display region Aldp (see FIG. 3). The processor 1 also cuts out, from the front-right image Sfr received in step S13, a partial front-right image Spfr shown in FIG. 14B. Here, the partial front-right image Spfr is a part overlaid onto the right-side display region Ardp (see FIG. 3).

Figure 15:
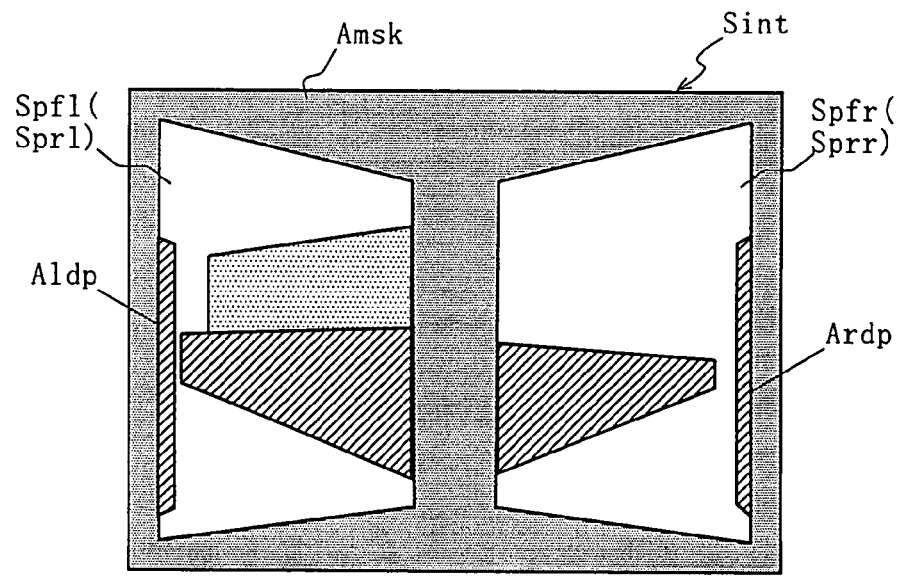
FIGS. 15A and 15B are drawings exemplarily showing, respectively, an intermediate image Sint generated in step S16 in FIG. 7, and a display front image Sfv generated in step S19 in FIG. 8.
Figure 15:
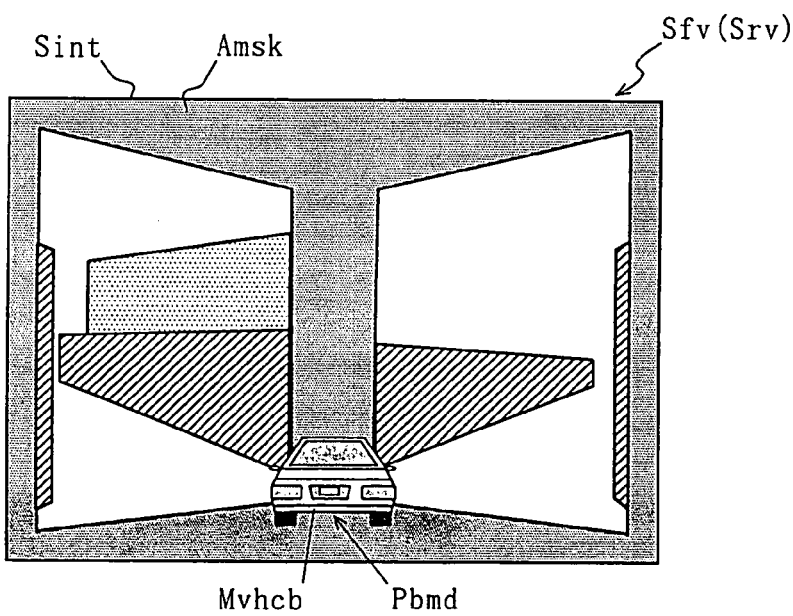

Then, on the frame memory, the processor 1 overlays (attaches) thus cutout partial front-left image Spfl onto the left-side display region Aldp (step S15). As for the partial front-right image Spfr, the processor 1 works similarly onto the right-side display region Ardp (step S16). After going through steps S15 and S16, as shown in FIG. 15A, generated on the frame memory is an intermediate image Sint, wherein the partial front-left image Spfl and the partial front-right image Spfr are overlaid onto the left-side display region Aldp and the right-side display region Ardp, respectively.

Figure 16:
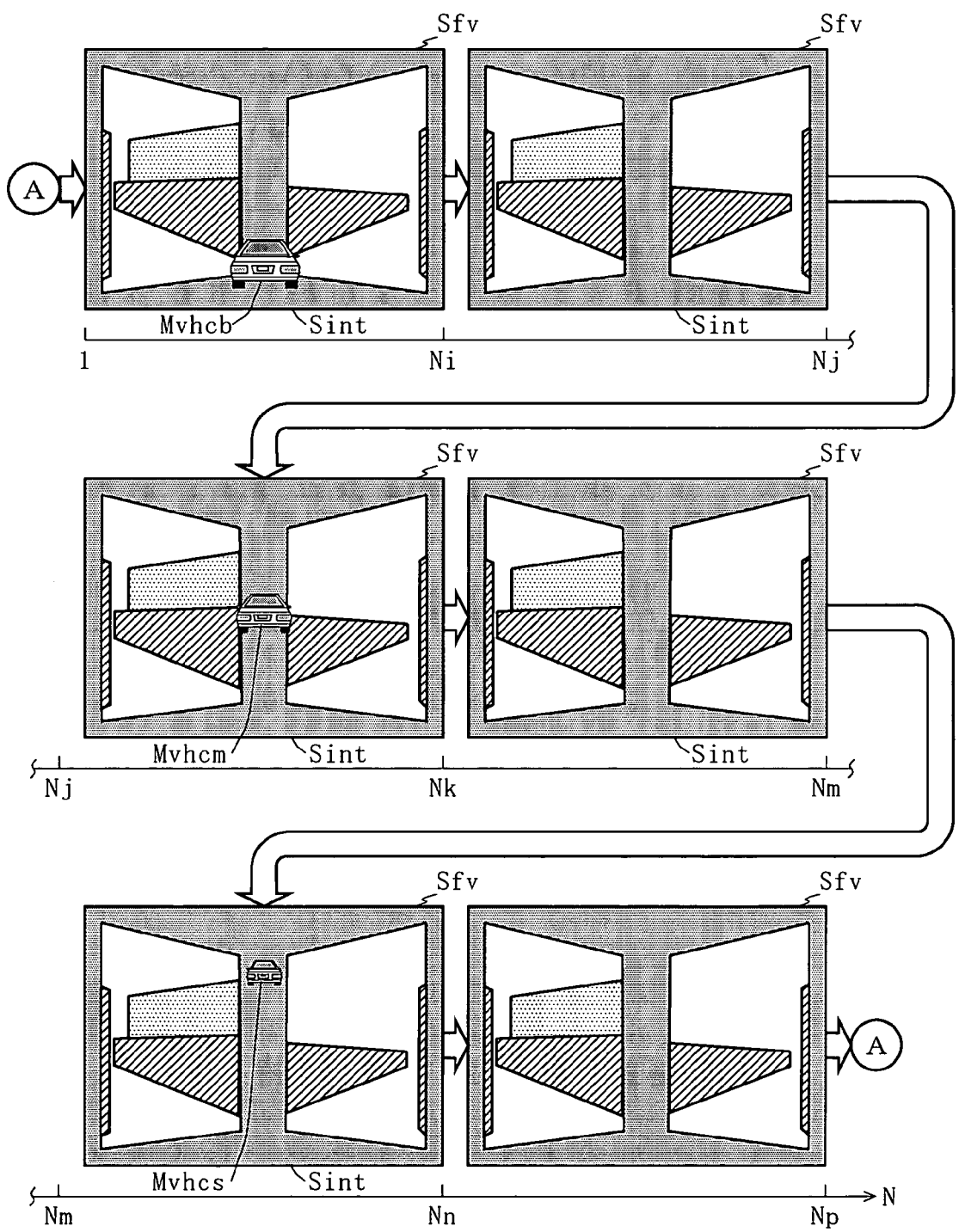
FIG. 16 is a diagram exemplarily showing how the display front image Sfv looks different depending on a counter value N.

The processor 1 then determines whether now is the time to overlay the vehicle model image (step S17). Here, prior to describing step S17 in detail, description about a unit cycle is made. The unit cycle denotes a time required for the counter value N reaching the upper limit Np started from the initial value 1. Here, the counter value N is referred to see what vehicle model image is to be overlaid. As shown in FIG. 16, when $1 <= N <= Ni$, the vehicle model image Mvhcb is the one to be overlaid. Here, Ni is a natural number of 2 or more, for example, 5. When $Ni < N <= Nj$, no vehicle model image is overlaid. Here, Nj is a natural number exceeding (Ni+1), for example, 10. When $Nj < N <= Nk$, the vehicle model image Mvhcm is the one to be overlaid. Here, Nk is a natural number exceeding (Nj+1), for example, 15. In the case of Nk<N<=Nm, no vehicle model image is overlaid. Here, Nm is a natural number exceeding (Nk+1), for example, 20. When Nm<N<=Nn, the vehicle model image Mvhcs is the one to be overlaid. Here, Nn is a natural number exceeding (Nm+1) but not exceeding the upper limit Np, for example, 25. In the case of Nn<N<=Np, no vehicle model image is overlaid.

In step S17, the processor 1 determines whether the counter value N satisfies any of 1<=N<=Ni, Nj<N<=Nk, and Nm<N<=Nn. If the counter value N satisfies none of those, the processor 1 decides now is not the time to overlay the vehicle model image, and the procedure jumps to step S110. If the counter value N satisfies any one of those, the processor 1 decides now is the time, and the procedure goes to step S18.

In this example, the counter value N is set to 1, and thus 1<=N<=Ni is determined as satisfied. Then, the processor 1 determines whether the vehicle model image Mvhcb is the one for overlay this time (step S18). In more detail, the processor 1 determines whether the counter value N satisfies 1<=N<=Ni. If No, the procedure goes to step S113 (see FIG. 9). If Yes, the processor 1 decides now is the time to overlay the vehicle model image Mvhcb, and the procedure goes to step S19.

As is now N=1, the processor 1 selects the vehicle model data Dmdl on the working area 3. The processor 1 also, on the frame memory, overlays (attaches) the vehicle model image Mvhcb represented by thus selected vehicle model data Dmdl onto the lower point Pbmd (see FIG. 4D) on the mask region Amsk (step S19). After going through step S19, generated on the frame memory is a single frame of the display front image Sfv (see FIG. 15B) wherein the vehicle model image Mvhcb is overlaid on the intermediate image Sint (see FIG. 15A). Thereafter, the processor 1 transfers the display front image Sfv on the frame memory to the display device 11 (step S110). The display device 11 then displays the display front image Sfv on its screen.

The processor 1 then determines whether the unit cycle is now through (step S111). Specifically, when the counter value N has reached Np, the processor 1 regards the unit cycle as being through, and the procedure goes to step S116. On the other hand, when N does not yet reach Np, the procedure goes to step S112 since the unit cycle is regarded as not being through yet.

As is now N=1, the processor 1 increments the counter value N by 1 (step S112). The procedure then returns to step S12 in FIG. 7 to repeat steps S12 to S112 until the counter value N becomes Ni. During when the counter value N is within the range between 1 and Ni, the display device 11 displays on its screen Ni frames of display front image Sfv as shown in FIG. 15B (see FIG. 16). Due to limited space, the display front image Sfv of FIG. 16 shows only one frame thereof.

After the Nith frame of display front image Sfv is transferred in step S110, and after the counter value N is updated to (Ni+1) in step S112, the procedure repeats steps S12 to S16 in FIG. 7. After those steps are through, generated on the frame memory is such intermediate image Sint as shown in FIG. 15A, wherein the front-left image Sfl and the front-right image Sfr are the ones newly captured therethrough. Here, as is now N=(Ni+1), the processor 1 determines in step S17 that none of 1<=N<=Ni, Nj<N<=Nk, and Nm<N<=Nn is satisfied. As the processor 1 decides now is not the time to overlay the vehicle model image, the procedure jumps to step S110. In step S110, the intermediate image Sint (see FIG. 15A) on the frame memory is transferred, as it is, to the display device 11 as the display front image Sfv. The display device 11 accordingly displays the display front image Sfv on its screen.

Next, as N does not yet reach Np, the processor 1 increments the counter value N by 1 in step S112. The procedure then returns to step S12 in FIG. 7 to repeat steps S12 to S17, and steps S110 to S112 until the counter value N becomes Nj. In the meantime, as shown in FIG. 16, displayed on the display device 11 are (Nj–Ni) frames of the display front image Sfv as shown in FIG. 15A.

After the Njth frame of display front image Sfv is transferred in step S10, and after the counter value N is updated to (Nj+1) in step S112, the procedure repeats steps S12 to S16 in FIG. 7 again. After those steps are through, generated on the frame memory is the intermediate image Sint (see FIG. 15A). As is now N=(Nj+1), the processor 1 determines in step S17 that Nj<N<=Nk is satisfied, but determines in step S18 that 1<=N<=Ni is not satisfied.

If this is the case, the processor 1 determines whether the vehicle model image Mvhcm is the one for overlay this time (step S113 in FIG. 9). In more detail, the processor 1 determines whether the counter value N satisfies Nj<N<=Nk. If not satisfied, the procedure goes to step S115, otherwise goes to step S114 as the processor 1 regards now is the time to overlay the vehicle model image Mvhcm.

Figure 17:
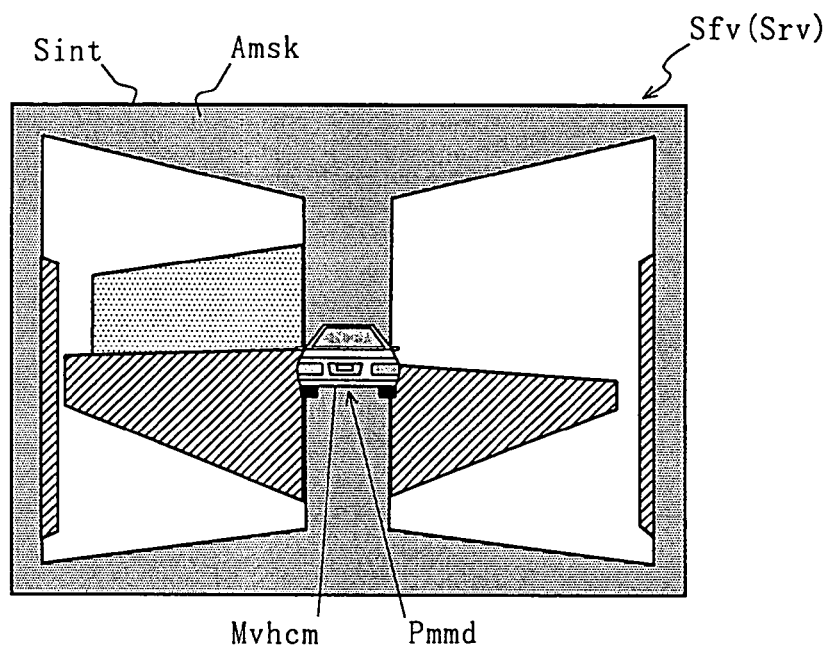
FIGS. 17A and 17B are diagrams exemplarily showing, respectively, the display front images Sfv generated in steps S113 and S115 in FIG. 9.
Figure 17:
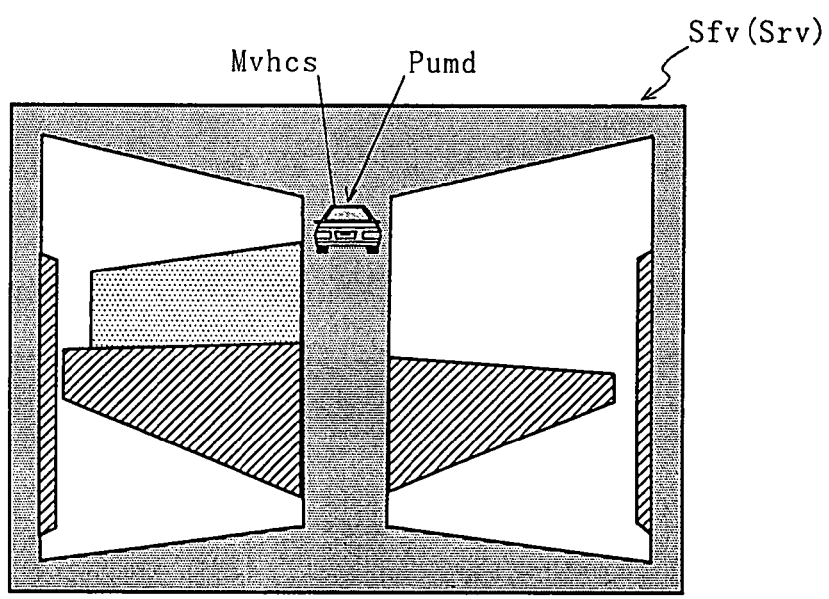

As is now N=(Nj+1), Nj<N<=Nk is determined as satisfied, and the procedure goes to step S114. The processor 1 selects the vehicle model data Dmdm on the working area 3. Then, the processor 1 overlays (attaches), on the frame memory, the vehicle model image Mvhcm represented by thus selected vehicle model data Dmdm onto the middle point Pmmd (see FIG. 4D) on the mask region Amsk (step S114). After going through step S114, generated on the frame memory is the display front image Sfv (see FIG. 17A) wherein the vehicle model image Mvhcm is overlaid on the intermediate image Sint (see FIG. 15A). Thereafter, the procedure goes to step S110 in FIG. 8, and thus the display device 11 displays such display front image Sfv as shown in FIG. 17A on its screen.

Since N does not yet reach Np, the processor 1 increments the counter value N by 1 in step S112, and the procedure returns to step S12 in FIG. 7. The procedure then repeats steps S12 to S18, steps S113 and S114, and steps S110 to S112 until the counter value N becomes Nk. In the meantime, as shown in FIG. 16, displayed on the display device 11 are (Nk–Nj) frames of the display front image Sfv as shown in FIG. 17A.

After the Nkth frame of display front image Sfv is transferred in step S110, and after the counter value N is updated to (Nk+1) in step S112, the procedure returns to step S12 in FIG. 7. Then, until the counter value N becomes Nm, the processor 1 carries out the same processing as for the period while the counter value N was within the range between (Ni+1) and Nj. In the meantime, as shown in FIG. 16, displayed on the display device 11 are (Nm–Nk) frames of the display front image Sfv as shown in FIG. 15A.

After the Nmth frame of display front image Sfv is transferred in step S110, and after the counter value N is updated to (Nm+1) in step S112, the procedure repeats again steps S12 to S16 in FIG. 7. Thereafter, generated on the frame memory is the intermediate image Sint (see FIG. 15A). As is now N=(Nm+1), the processor 1 determines in step S17 that Nm<N<=Nn is satisfied, but not 1<=N<=Ni in step S18 and Nj<=N<=Nk in step S113.

This tells now is the time to overlay the vehicle model image Mvhcs, and thus the procedure goes to step S115. The processor 1 selects the vehicle model data Dmds on the working area 3. The processor 1 then overlays (places), on the frame memory, the vehicle model image Mvhcs represented by selected vehicle model data Dmds onto the upper point Pumd (see FIG. 4D) on the mask region Amsk (step S115). After going through step S115, generated on the frame memory is the display front image Sfv (see FIG. 17B) wherein the vehicle model image Mvhcs is overlaid on the intermediate image Sint (see FIG. 15A). Thereafter, the procedure goes to step S110 in FIG. 8, and thus the display device 11 displays such display front image Sfv as shown in FIG. 17B on its screen.

Since N does not yet reach Np, the processor 1 increments the counter value N by 1 in step S112, and the procedure returns to step S12 in FIG. 7. The procedure then repeats steps S12 to S18, steps S113 and S115, and steps S110 to S112 until the counter value N becomes Nn. In the meantime, as shown in FIG. 16, displayed on the display device 11 are (Nn−Nm) frames of the display front image Sfv as shown in FIG. 17B.

After the Nnth frame of display front image Sfv is transferred in step S110, and after the counter value N is updated to (Nn+1) in step S112, the procedure returns to step S12 in FIG. 7. Then, until the counter value N becomes Np, the processor 1 carries out the same processing as for the period while the counter value N was within the range between (Ni+1) and Nj. In the meantime, as shown in FIG. 16, displayed on the display device 11 are (Np−Nn) frames of the display front image Sfv as shown in FIG. 15A.

After the Npth frame of display front image Sfv is transferred in step S110, the procedure goes to step S111. In step S111, as N has reached Np, the processor 1 determines that the unit cycle is now through. Thus, the procedure goes to step S116. The processor 1 then determines whether now is the time to end the front monitor mode, that is, whether the vehicle Vusr has passed the intersection (step S116).

In step S116, the following two methods are typically applied to find whether the vehicle Vusr has passed the intersection. In the first method, the processor 1 checks whether the current speed of the vehicle Vusr has exceeded a predetermined reference speed Vrefl. Generally, the speed of the vehicle Vusr is relatively low within the intersection, but is increased once the vehicle Vusr exits therefrom. Here, the above reference speed Vrefl is set in advance to a value which adequately tells whether the vehicle Vusr is still in the intersection. When the current speed of the vehicle Vusr is not more than (or lower) the reference speed Vrefl, the processor 1 understands that the vehicle Vusr is still in the intersection, that is, now is too soon to end the front monitor mode. On the other hand, if the current speed is exceeding (or not less than) the reference speed Vrefl, the processor 1 understands that the vehicle Vusr is out of the intersection, that is, now is the time to end the front monitor mode.

In the second method, the input device 8 is functionally capable of ending the front monitor mode with the push on an operation button (not shown), which is provided additionally to the operation buttons 9 and 10. The driver pushes the operation button when the vehicle Vusr exits from the intersection. When detecting in step S116 a push on the operation button, the processor 1 understands now is the time to end the front monitor mode. Conversely, if detecting no push on the operation button in step S116, the processor 1 understands now is too soon to end the front monitor mode.

If determined not yet in step S116, the procedure returns to step S11 to reset the counter value N to 1 for the same processing identified by steps S11 to S115 again. This means starting a new unit cycle, and the display front image Sfv as shown in FIG. 16 is displayed on the display device 11. On the other hand, if determined Yes in step S116, this is the end of the processing in FIGS. 7 to 9.

By going through such processing in FIGS. 7 to 9, the drive assistant device Uast1 assists the driver of the vehicle Vusr for the duration in the intersection by displaying him/her the display front images Sfv, which specifically indicate the driver's blind regions Aflb and Afrb (see FIG. 5). Here, as does in the conventional monitor device, the display front image Sfv includes the partial front-left image Spfl and the partial front-right image Spfr.

However, the display front image Sfv herein includes, as shown in FIG. 16, any of the vehicle model images Mvhcb, Mvhcm, and Mvhcs differed in size, and the counter value N determines which vehicle model image. For example, when the counter value N is considered relatively small (in this embodiment, when 1<=N<=Ni), selected is the vehicle model image Mvhcb being largest among all for display on the lower part of the screen of the display device 11 (i.e., on the lower point Pbmd). When the counter value N is considered relatively large (in this embodiment, when NM<N<=Nn), selected is the vehicle model image Mvhcs being smallest for display on the upper part of the screen of the display device 11 (i.e., on the upper point Pumd). When the counter value N is considered neither relatively large nor small (in this embodiment, when Nj<N<=Nk), selected is the vehicle model image Mvhcm for display on the center part of the screen of the display device 11 (i.e., on the middle point Pmmd).

Those vehicle model images Mvhcb, Mvhcm, and Mvhcs create a moving picture as if the vehicle is moving forward on the display device 11. In other words, with those vehicle model images, the driver can tell which direction the current display surrounding image is covering. Accordingly, in the case that the display rear image Sfr (described later) is available together with the display front image Sfv, the driver can instantaneously recognize which image of the display rear image Sfr and the display front image Sfv is now on display by following the movement of the vehicle model image.

In such display front image Sfv, the partial front-left image Spfl and the partial front-right image Spfr are overlaid onto the left- and right-side display regions Aldp and Ardp, respectively, on the mask image Smsk. Further, on the center mask region Acmsk formed between those left- and right-side display regions Aldp and Ardp on the mask image Smsk, the vehicle model image Mvhcb, for example, is overlaid. Accordingly, the driver can instantaneously recognize that the display front image Sfv is now on the display device 11 by following the movement of the vehicle model image.

In the above, the front monitor mode is exemplarily executed when the vehicle Vusr encounters any intersection. This is not restrictive, and the front monitor mode may be executed when the vehicle Vusr moves forward to exit from a parking space, for example. Before doing so, the driver pushes the operation button 9, and accordingly the display front image Sfv is displayed by the drive assistant device Uast1.

In step S1 in FIG. 6, if the received signal is determined as not the instruction signal Ifm, the processor 1 then checks if the received signal is the instruction signal Irm (step S3). If determined No, this is the end of the processing in FIG. 6. On the other hand, if determined Yes, the processor 1 executes the rear monitor mode (step S4).

Figure 10:
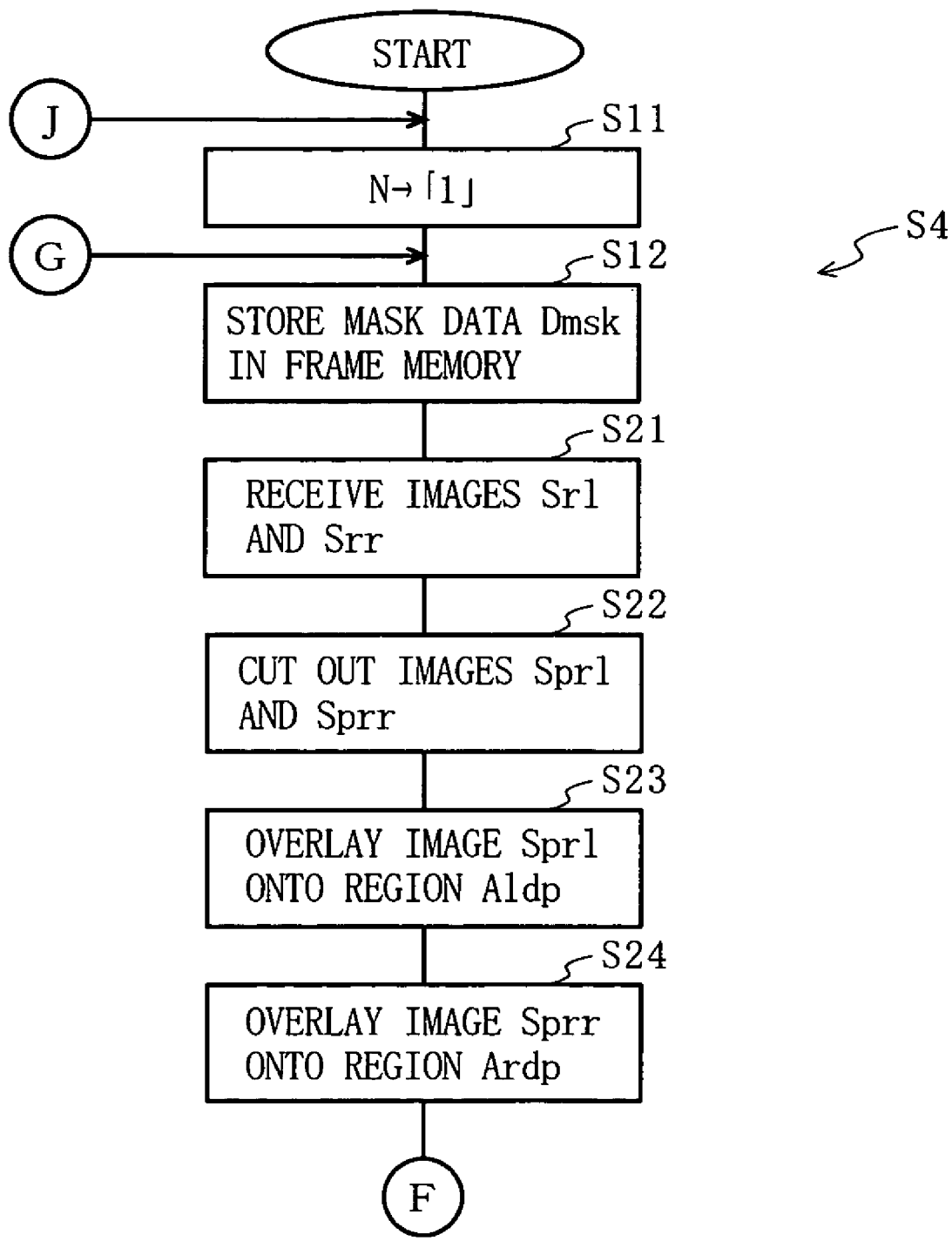
FIG. 10 a flowchart showing the first part of the detailed procedure in step S4 in FIG. 6.
Figure 11:
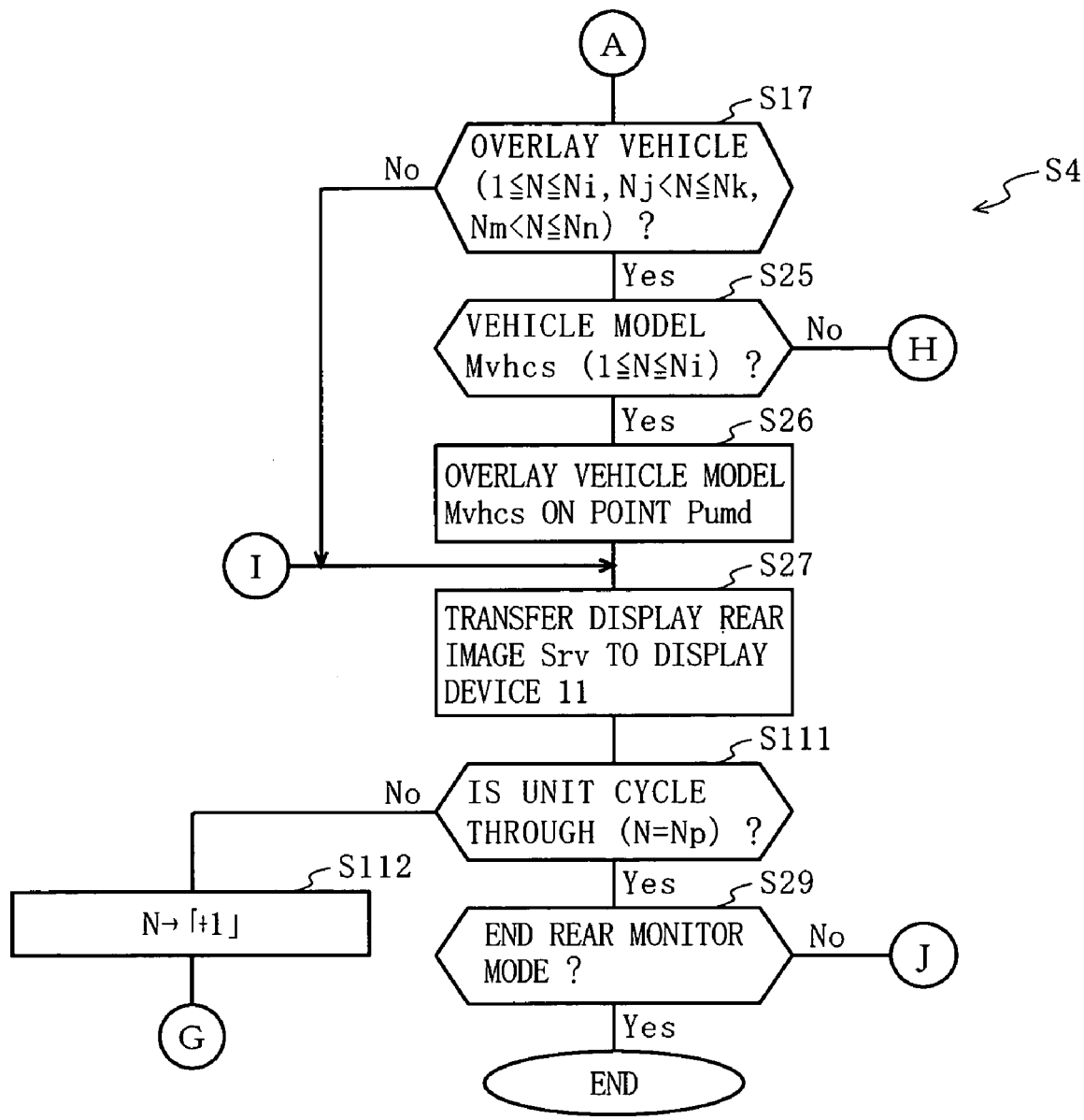
FIG. 11 is a flowchart showing the second part of the detailed procedure in step S4 in FIG. 6.
Figure 12:
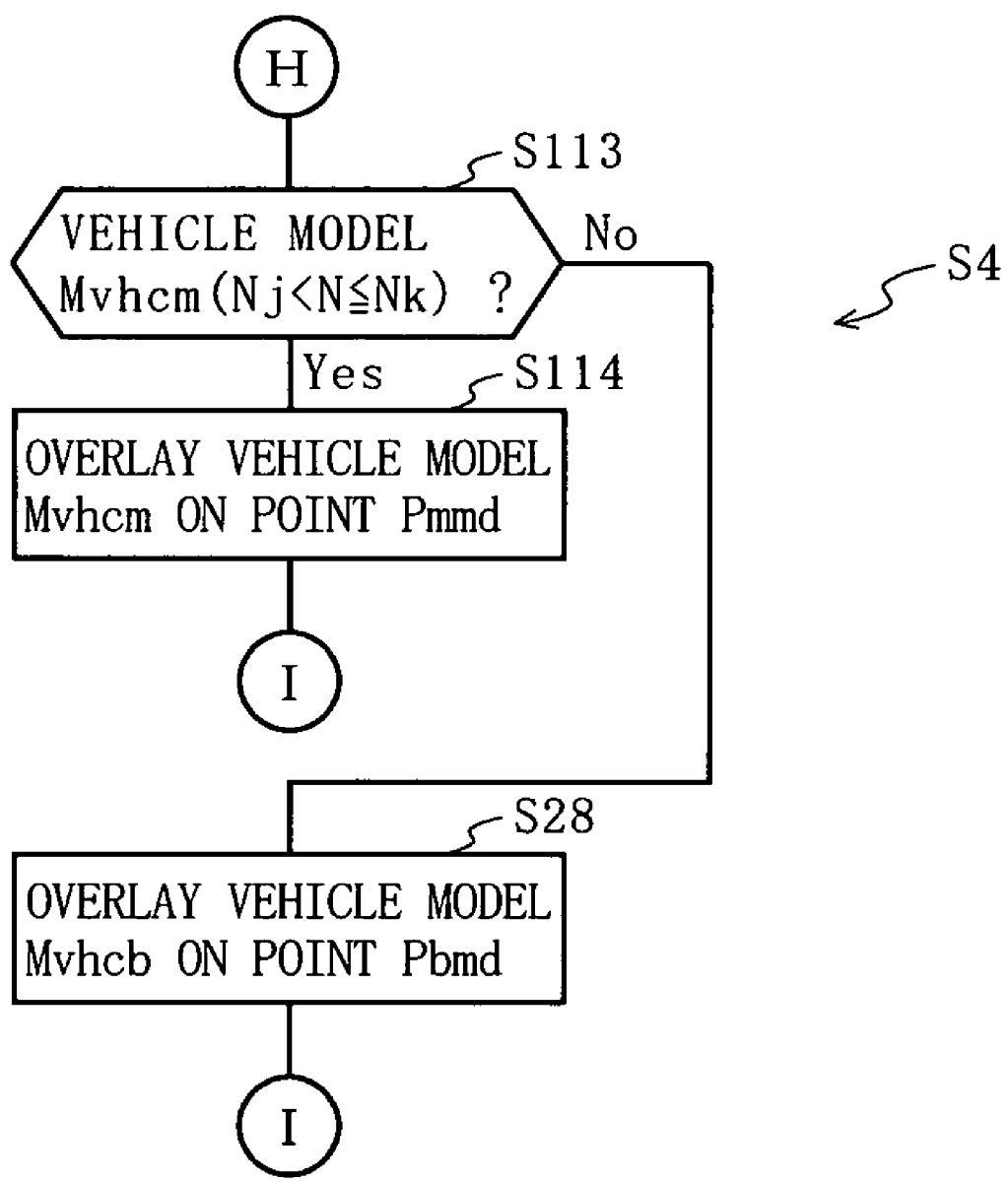
FIG. 12 is a flowchart showing the last part of the detailed procedure in step S4 in FIG. 6.
Figure 18:
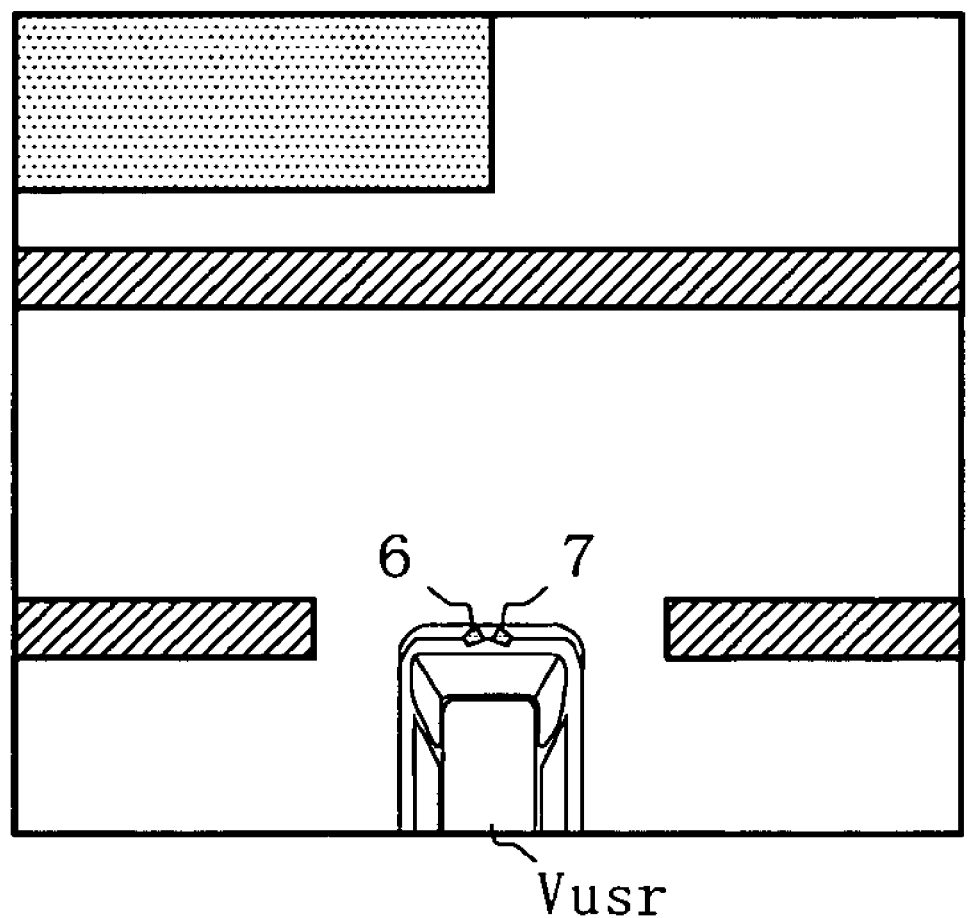
FIG. 18 is a diagram showing the vehicle Vusr moving backward to exit from a parking space.

Referring to FIG. 18, assume that the vehicle Vusr is now moving backward to exit from a parking space. In this case, the driver pushes the operation button 10, and the input device 8 responsively transmits the instruction signal Irm to the processor 1. The processor 1 then determines that the instruction signal Irm has been received in step S3, and thus carries out the rear monitor mode. In the rear monitor mode, the display rear image Srv is generated for assisting the driver to drive, and the detailed procedure thereof is shown in FIGS. 10 to 12. Compared with the flowcharts in FIGS. 7 to 9, those in FIGS. 10 to 12 have steps S21 to S29 as alternatives to steps S13 to S16, steps S18 to S110, and steps S115 and S116. Here, any identical step is under the same step number, and is not described again.

In FIG. 10, after steps S11 and S12 are through, the processor 1 instructs the image capture devices 6 and 7 on the rear side of the vehicle Vusr to capture the rear-left image Srl and the rear-right image Srr, respectively. The image capture device 6 responsively captures such rear-left image Srl for storage in the working area 3. The image capture device 7 also responsively captures such rear-right image Srr for storage in the working area 3. In such manner, the processor 1 receives the rear-left image Srl and the rear-right image Srr (step S21). Here, for convenience, those rear-left image Srl and the rear-right image Srr are similar to those shown in FIGS. 13C and 13B.

The processor 1 then carries out cutout processing (step S22). More specifically, from the rear-left image Srl received in step S21, the processor 1 cuts out such partial rear-left image Sprl as shown in FIG. 14B. Here, the partial rear-left image Sprl is an image overlaid onto the left-side display region Aldp (see FIG. 3). The processor 1 also cuts out, from the rear-right image Srr received in step S21, such partial rear-right image Sprr as shown in FIG. 14A. Here, the partial rear-right image Sprr is an image overlaid onto the right-side display region Ardp (see FIG. 3).

Then, on the frame memory, the processor 1 overlays (places) thus cutout partial rear-left image Sprl onto the left-side display region Aldp (step S23). As for the partial rear-right image Sprr, the processor 1 works similarly onto the right-side display region Ardp (step S24). After going through steps S23 and S24, generated on the frame memory is the intermediate image Sint (see FIG. 15A), wherein the partial rear-left image Sprl and the partial rear-right image Sprr are overlaid onto the left-side display region Aldp and the right-side display region Ardp, respectively.

The processor 1 then determines, based on the counter value N, whether or not now is the time to overlay the vehicle model image (step S17). If determined No, the procedure jumps to step S27, otherwise goes to step S25.

In this example, the counter value N is set to 1, and thus the procedure goes from step S17 to S25. The processor 1 determines whether the vehicle model image Mvhcs is the one for overlay this time (step S25). If $1<=N<=Ni$ is not satisfied, the procedure goes to step S113 (see FIG. 12) as the processor 1 decides now is not the time to overlay the vehicle model image Mvhcs. Conversely, if $1<=N<=Ni$ is satisfied, the processor 1 decides now is the time, and the procedure goes to step S26.

As is now N=1, the processor 1 selects the vehicle model data Dmds (see FIG. 2) on the working area 3. The processor 1 also, on the frame memory, overlays (places) the vehicle model image Mvhcs represented by thus selected vehicle model data Dmds onto the upper point Pumd (see FIG. 4D) on the mask region Amsk (step S26). The display rear image Srv is thus generated (see FIG. 17B). Thereafter, the processor 1 transfers the display rear image Srv on the frame memory to the display device 11 (step S27). The display device 11 then displays the display rear image Srv on its screen.

The processor 1 then determines, based on the counter value N, whether the unit cycle is now through (step S111). Specifically, when the processor 1 regards the unit cycle as being through, the procedure goes to step S116. If not yet, the procedure goes to step S112.

Figure 19:
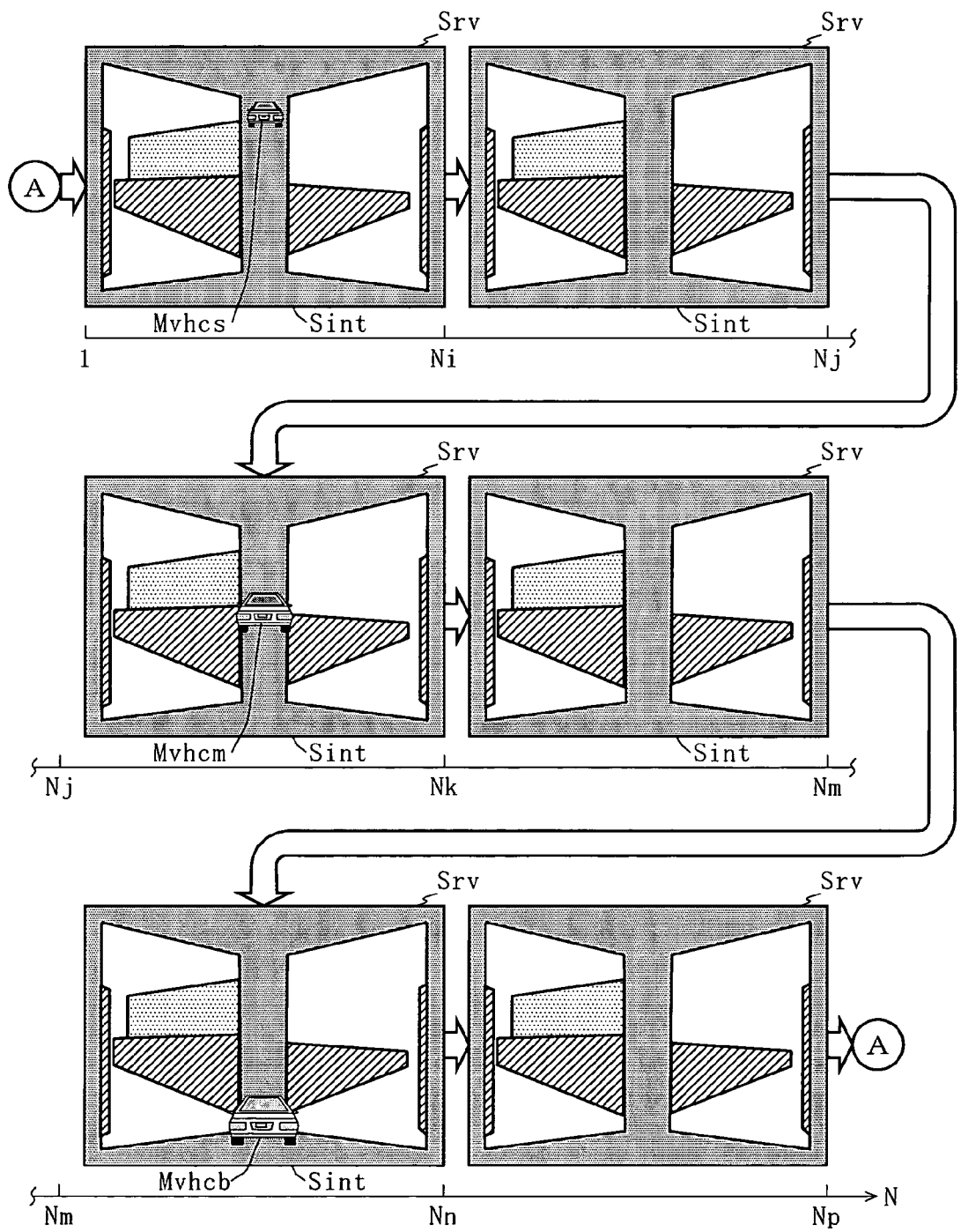
FIG. 19 is a diagram exemplarily showing how the display rear image Srv looks different depending on a counter value N.

As is now N=1, the processor 1 increments the counter value N by 1 (step S112). The procedure then returns to step S12 in FIG. 7 to repeat step S12, steps S21 to S24, step S17, steps S25 to S27, and steps S111 and S112 until the counter value N becomes Ni. In the meantime, as shown in FIG. 19, the display device 11 displays Ni frames of display rear image Srv as shown in FIG. 17B. Due to limited space, the display rear image Srv of FIG. 19 shows, as in FIG. 16, only one frame thereof for each time period depending on the counter value N.

After the Nith frame of display rear image Srv is transferred in step S27, and after the counter value N is updated to (Ni+1) in step S112, the procedure repeats steps S12 to S24 in FIG. 10. After those steps are through, generated on the frame memory is a new intermediate image Sint (see FIG. 15A). Here, as is now N (Ni+1), the processor 1 determines in step S17 that now is not the time to overlay the vehicle model image yet. In this case, the intermediate image Sint (see FIG. 15A) on the frame memory is transferred, as it is, to the display device 11 as the display rear image Srv in step S27. The display device 11 accordingly displays the display rear image Srv on its screen.

Next, as N does not yet reach Np, the processor 1 increments the counter value N by 1 in step S112. The procedure then returns to step S12 in FIG. 10 to repeat steps S12 to S24, step S17, step S27, and steps S110 and S112 until the counter value N becomes Nj. In the meantime, as shown in FIG. 19, displayed on the display device 11 are (Nj−Ni) frames of the display rear image Srv as shown in FIG. 15A.

After the Njth frame of display rear image Srv is transferred in step S110, and after the counter value N is updated to (Nj+1) in step S112, the procedure repeats steps S12 to S24 in FIG. 10 again. After those steps are through, generated on the frame memory is another new intermediate image Sint. As is now N=(Nj+1), the processor 1 determines in step S17 that now is the time to overlay any of the vehicle model images, but in step S25, decides that is not the vehicle model image Mvhcs.

If this is the case, the processor 1 then determines whether the vehicle model image Mvhcm is the one for overlay this time (step S113 in FIG. 12). If determined No, the procedure goes to step S28, otherwise goes to step S114 as the processor 1 determines the vehicle model image Mvhcm is the one for overlay this time.

As is now N=(Nj+1), the procedure goes to step S114. The processor 1 overlays, on the frame memory, the vehicle model image Mvhcm onto the middle point Pmmd (see FIG. 4D) on the mask region Amsk (see FIG. 17A). The display rear image Srv is thus generated. Thereafter, the procedure goes to step S27 in FIG. 11, and thus the display device 11 displays such display rear image Srv as shown in FIG. 17A on its screen. The procedure then repeats steps S12 to S24, step S17, step S25, steps S113 and S114, step S27, and steps S111 and S112 until the counter value N becomes Nk. In the meantime, as shown in FIG. 19, displayed on the display 11 are (Nk−Nj) frames of display rear image Srv as shown in FIG. 17A.

After the Nkth frame of display rear image Srv is transferred in step S27, and after the counter value N is updated to (Nk+1) in step S112, the procedure returns to step S12 in FIG. 10. Then, until the counter value N becomes Nm, the processor 1 carries out the same processing as for the period while the counter value N was within the range between (Ni+1) and Nj. In the meantime, as shown in FIG. 19, displayed on the display device 11 are (Nj−Ni) frames of display rear image Srv as shown in FIG. 15A.

After the Nmth frame of display rear image Srv is transferred in step S27, and after the counter value N is updated to (Nm+1) in step S112, the procedure repeats again steps S12 to S24 in FIG. 10. Thereafter, generated on the frame memory is a new intermediate image Sint. As is now N (Nm+1), the processor 1 determines in step S17 that now is the time to overlay any one of the vehicle model images, but in step S25, decides that is not the vehicle model image Mvhcs, and in step S113, decides that is not the vehicle model image Mvhcm, either.

This indicates that it is now time to overlay the vehicle model image Mvhcb, and thus the procedure goes to step S28. The processor 1 selects the vehicle model data Dmdl on the working area 3. The processor 1 then overlays, on the frame memory, the vehicle model image Mvhcb onto the lower point Pbmd (see FIG. 4D) on the mask region Amsk (step S28). After going through step S28, generated on the frame memory is the display rear image Srv (see FIG. 15B) wherein the vehicle model image Mvhcb is overlaid on the intermediate image Sint (see FIG. 15A). Thereafter, the procedure goes to step S27 in FIG. 11, and thus the display device 11 displays such display rear image Srv as shown in FIG. 15B on its screen.

Since N does not yet reach Np, the processor 1 increments the counter value N by 1 in step S112, and the procedure repeats steps S12 to S24, step S17, step S25, step S113, steps S27 and S28, and steps S111 and S112 until the counter value N becomes Nn. In the meantime, as shown in FIG. 19, displayed on the display 11 are (Nn−Nm) frames of display rear image Srv as shown in FIG. 15B.

After the Nnth frame of display rear image Srv is transferred in step S27, and after the counter value N is updated to (Nn+1) in step S112, the procedure returns to step S12 in FIG. 10. Then, until the counter value N becomes Np, the processor 1 carries out the same processing as for the period while the counter value N was within the range between (Ni+1) and Nj. In the meantime, as shown in FIG. 19, displayed on the display device 11 are (Np−Nn) frames of display rear image Srv as shown in FIG. 15A.

After the Npth frame of display rear image Srv is transferred in step S27, the procedure goes to step S111. In step S111, as N has reached Np, the processor 1 determines that the unit cycle is now through. Thus, the procedure goes to step S29. The processor 1 then determines whether now is the time to end the rear monitor mode (step S29).

In step S29, to see when to end the rear monitor mode, the same methods as those for the front monitor mode are applied, and thus not described again. If determined not yet in step S29, the procedure returns to step S11 to reset the counter value N to 1 for the same processing again. This means starting a new unit cycle, and the display rear image Srv as shown in FIG. 19 is displayed on the screen of the display device 11. On the other hand, if determined Yes in step S29, this is the end of the processing in FIGS. 10 to 12.

By going through such processing in FIGS. 10 to 12, the drive assistant device Uast1 assists the driver of the vehicle Vusr by displaying him/her the display rear images Srv, which specifically indicate the driver's blind regions Arlb and Arrb (see FIG. 5). Here, as does the display front image Sfv, the display rear image Srv also includes, as shown in FIG. 19, any of the vehicle model images Mvhcb, Mvhcm, and Mvhcs differed in size, and the counter value N determines which vehicle model image. Here, with those vehicle model images, created in the display rear image Srv is a moving picture as if the vehicle Vusr is moving backward, which is opposite in the display front image Sfv. Accordingly, in the case that the display rear image Sfr is available together with the display front image Sfv, the driver can instantaneously recognize that the display front image Sfv is now on the display device 11 by following the movement of the vehicle model image.

In such display rear image Srv, the partial rear-left image Sprl and the partial rear-right image Sprr are overlaid onto the left- and right-side display regions Aldp and Ardp, respectively, on the mask image Smsk. Further, on the center mask region Acmsk formed between those left- and right-side display regions Aldp and Ardp on the mask image Smsk, the vehicle model image Mvhcb, for example, is overlaid. Accordingly, the driver can instantaneously recognize which image of the partial rear-left image Sprl and the partial rear-right image Spfr shows which side of the vehicle Vusr.

In the above, the rear monitor mode is exemplarily executed when the vehicle Vusr moves backward to exit from the parking space. This is not restrictive, and the rear monitor mode may be executed whenever the vehicle Vusr moves backward, for example.

Figure 20:
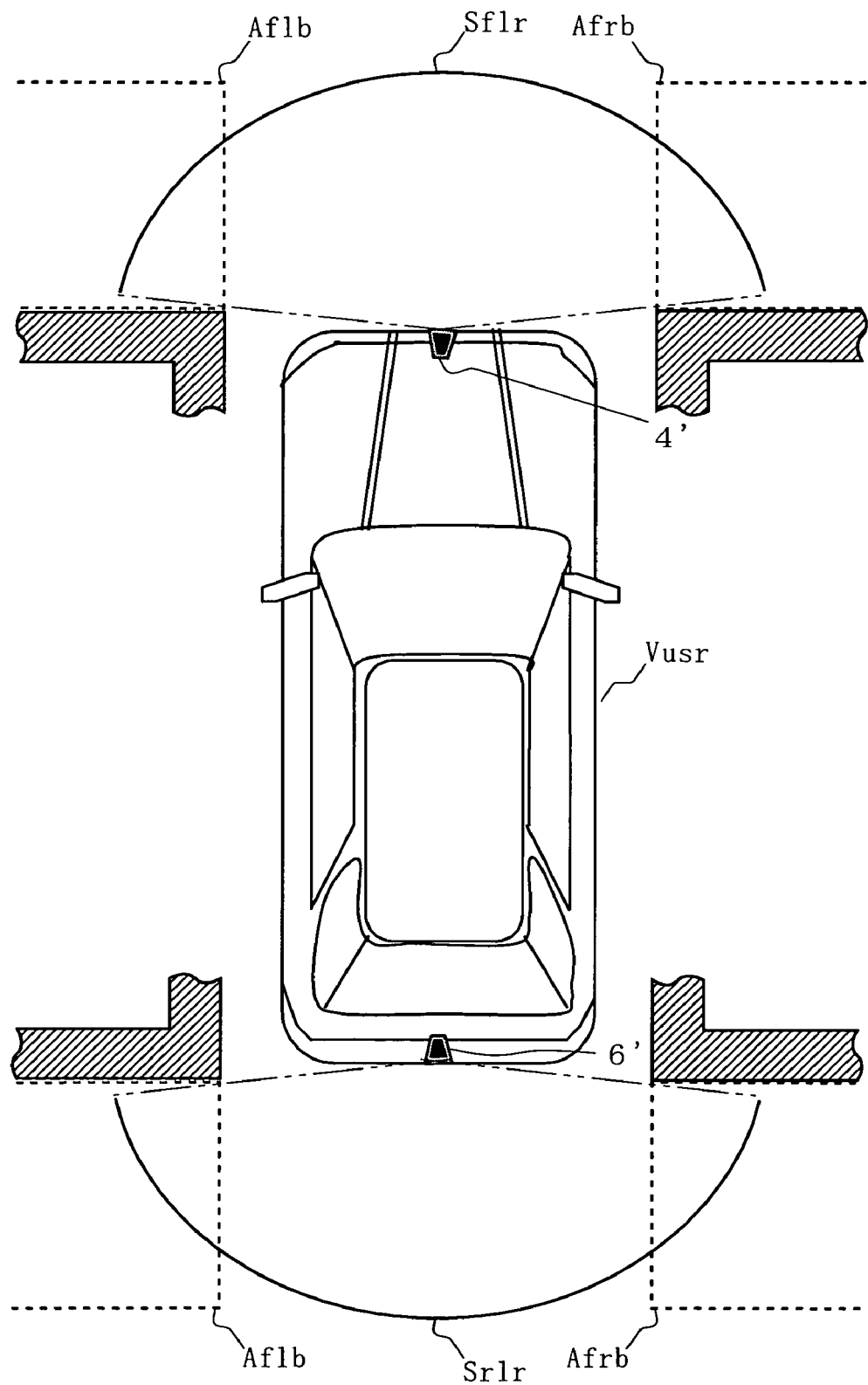
FIG. 20 is a diagram exemplarily showing where image capture devices 4' and 6' are placed in the vehicle Vusr.

In the above, the image capture devices 4 and 5 capture the front-left image Sfl and the front-right image Sfr, respectively, and the image capture devices 6 and 7 capture the rear-left image Srl and the rear-right image Srr, respectively. This is not restrictive, and as shown in FIG. 20, an image capture device 4' on the front of the vehicle Vusr and an image capture device 6' on the rear thereof will do. If this is the case, the image capture device 4' is preferably provided with a wide-angle lens so as to capture a front image Sflr which indicates, at least, both of the blind regions Aflb and Afrb described by referring to FIG. 5. To generate the display front image Sfv, the processor 1 cuts out, from the front image Sflr, both the partial front-left image Spfl and the partial front-right image Spfr for overlay onto the left-side display region Aldp and the right-side display region Ardp, respectively. The image capture device 6' is also preferably provided with a wide-angle lens, as shown in FIG. 20, so as to capture a rear image Srlf which indicates, at least, both of the blind regions Arlb and Arrb.

Also, the intermediate image Sint in the above is the one generated by overlaying the partial front-left image Spfl and the partial front-right image Spfr to the left-side display region Aldp and the right-side display region Ardp (see steps S13 to S16 in FIG. 7 for details). This is not restrictive, and as is similarly done in the conventional monitor device in image processing, the intermediate image Sint may be generated by overlaying the mask image Smsk (see FIG. 3) onto a single image wherein the front-left image Sfl and the front-right image Sfr are combined together with no space therebetween.

Also, in the above, the vehicle model images help the driver recognize which direction the current image on display indicates. Here, the vehicle model image is not restrictive, and any image simpler in shape will work just fine to indicate which direction.

Figure 21:
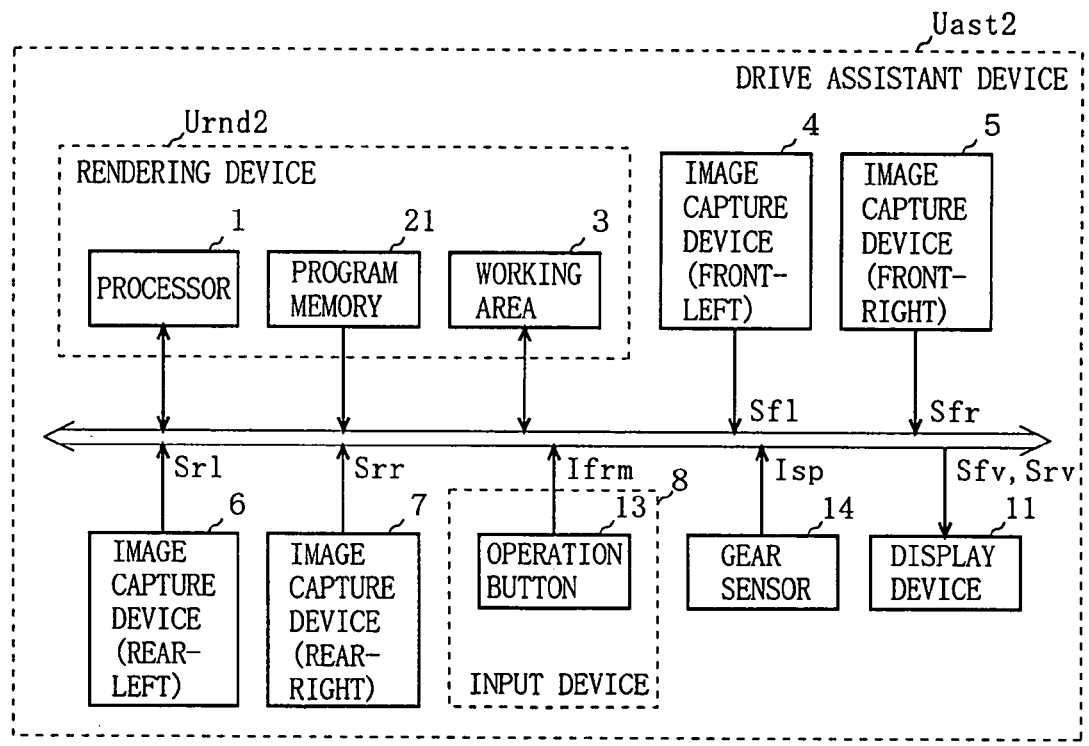
FIG. 21 is a block diagram showing the structure of a drive assistant device Uast2 having incorporated therein a rendering device Urnd2, which is a modified version of the rendering device Urnd1 of FIG. 1.

Referring to FIG. 21, described next is about a drive assistant device Uast2 having a rendering device Urnd2 incorporated thereinto. Here, the rendering device Urnd2 is a modified version of the rendering device Urnd1. In FIG. 21, the only difference therebetween is program memory 21 provided in the rendering device Urnd2 as an alternative to the program memory 2. Thus, any identical component is under the same reference numeral, and is not described again. As for the drive assistant device Uast2, the input device therein has an operation button 13 provided instead of the operation buttons 9 and 10, and a gear sensor 14 additionally provided. Other than those, the drive assistant devices Uast1 and Uast2 are the same in structure, and thus any identical component is under the same reference numeral and not described again here.

Figure 22:
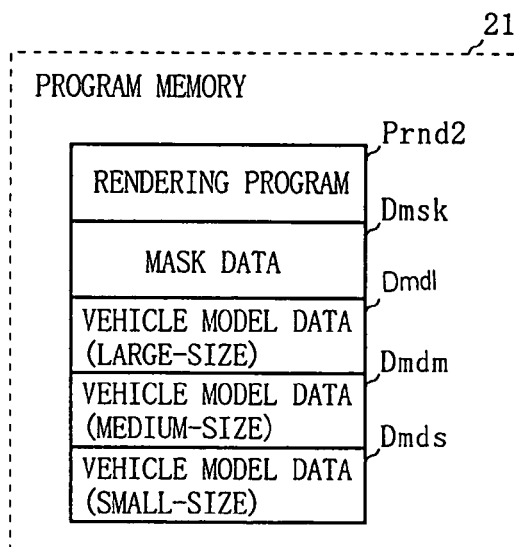
FIG. 22 is a diagram showing that program memory 12 of FIG. 21 stores a rendering program Prnd2 and any other necessary data therein.

The program memory 21 is typified by ROM (Read Only Memory), and as shown in FIG. 22, stores a rendering program Prud2. The program memory 21 also includes mask data Dmsk, and vehicle model data Dmdl, Dmdm, and Dmds, all of which are needed at time of executing the rendering program Prnd2. As for details thereof, see the above.

In FIG. 21, the input device 8 is provided with, at least, the operation button 13, a push on which starts either the front monitor mode (step S2 in FIG. 23) or the rear monitor mode (step S4 in FIG. 23) in response to an instruction signal. When the driver wants to see a display image (a display front image Sfv or a display rear image Srv) from the drive assistant device Uast2, he/she pushes the operation button 13. In response to the push, the input device 8 transmits an instruction signal Ifrm to the processor 1 to instruct it to start either the front monitor mode or the rear monitor mode.

When driving the vehicle having the present drive assistant Uast2, the driver moves a gearshift to shift gears to an upper or lower. The gear sensor 14 is provided for detecting in what gear the gearshift is. Based on the result detected thereby, the gear sensor 14 generates, for transmission to the processor 1, a gearshift signal Isp, which indicates in what gear the gearshift is.

Described next is the operation of such drive assistant device Uast2. Once the drive assistant device Uast2 is turned ON, the processor 1 starts executing the rendering program Prnd2, and at the same time, reads the mask data Dmsk, and the vehicle model data Dmdl, Dmdm, and Dmds to the working area 3.

Figure 23:
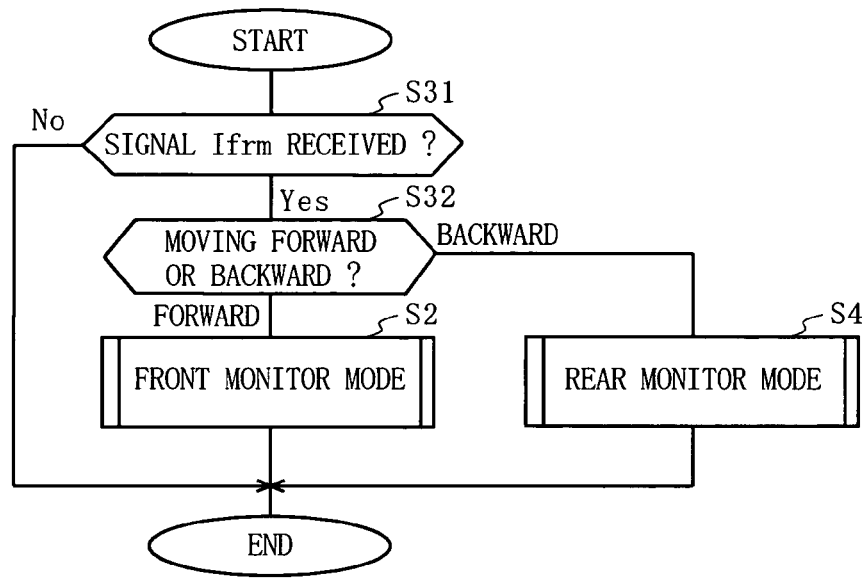
FIG. 23 is a main flowchart showing the operation of the drive assistant device Uast2 of FIG. 21.

If receiving any received signal, the processor 1 starts carrying out the processing of the main flowchart in FIG. 23. Compared with the main flowchart in FIG. 6, steps S31 and S32 are newly included instead of steps S1 and S3. Other than those, those two main flowcharts are the same, and thus any identical step is under the same step number, and is not described here.

In FIG. S23, the processor 1 first determines whether the received signal is the instruction signal Ifrm (step S31). If determined No, this is the end of the processing in FIG. 23. If determined Yes, the processor 1 understands that the driver now needs the display front image Sfv or the display rear image Srv. The procedure then goes to step S32.

In step S32, the instruction signal Ifrm is not a clue enough for the processor 1 to specify which display image is requested. Thus, the processor 1 receives the gearshift signal Isp from the gear sensor 14 to know in what gear the gearshift is, and then determines whether the vehicle Vusr is now moving forward or backward (step S32). If determined the vehicle is moving forward, the processor 1 carries out the front monitor mode (step S2). If determined backward, on the other hand, carried out is the rear monitor mode (step S4).

In the above first embodiment, there are two operation buttons 9 and 10 provided for the driver's selection of a push depending on which display image he/she wants. As such, in the drive assistant device Uast1, the driver has to selectively operate several buttons. In this modified example, such selection is left for the processor 1 based on the gearshift signal Isp from the gear sensor 14. Therefore, the driver needs only to push the single operation button 13 to obtain either the display front image Sfv or the display rear image Srv, whichever meeting his/her needs. As is known from the above, with the gear sensor 14, the drive assistant device Uast2 can be more driver friendly.

Figure 24:
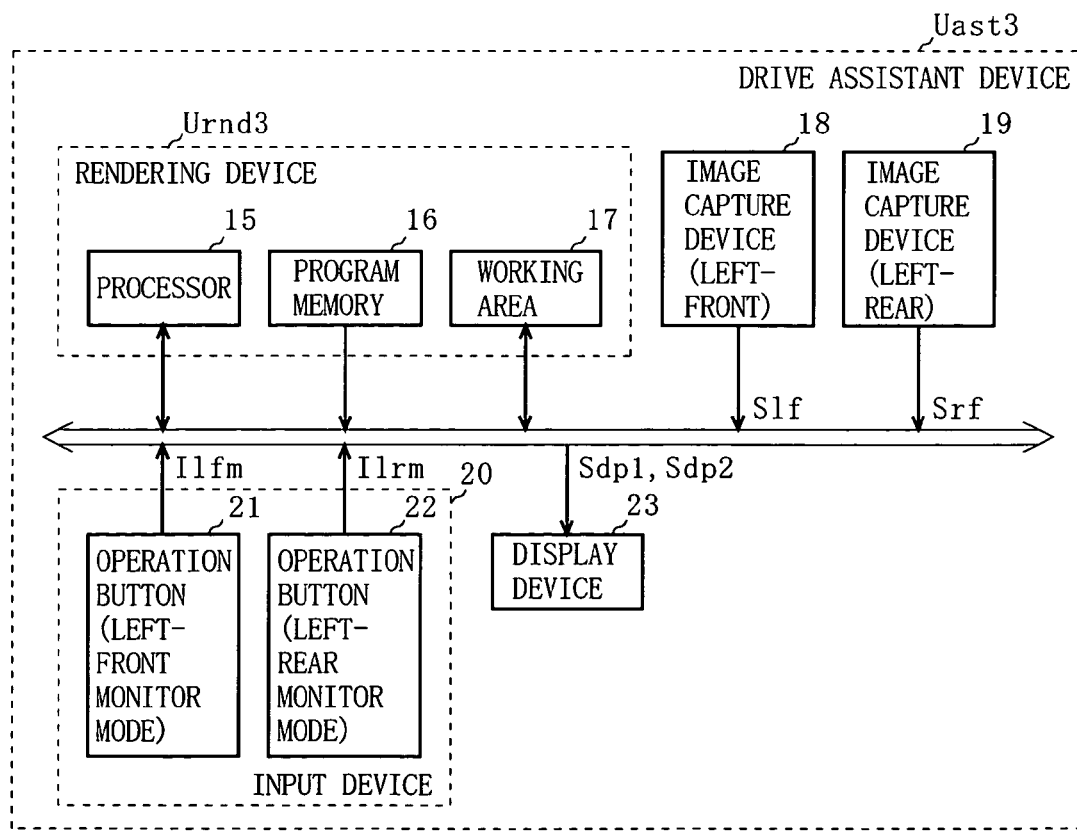
FIG. 24 is a block diagram showing the structure of a drive assistant device Uast3 having incorporated therein a rendering device Urnd3 according to a second embodiment.

FIG. 24 is a block diagram showing the hardware structure of a rendering device Urnd3 according to a second embodiment of the present invention. In FIG. 24, the rendering device Urnd3 generates images for drive assistance (display side images Sdp1 and Sdp2, which will be described later) for display on a display device 23. The rendering device Urnd3 includes a processor 15, program memory 16, and a working area 17.

Figure 25A:
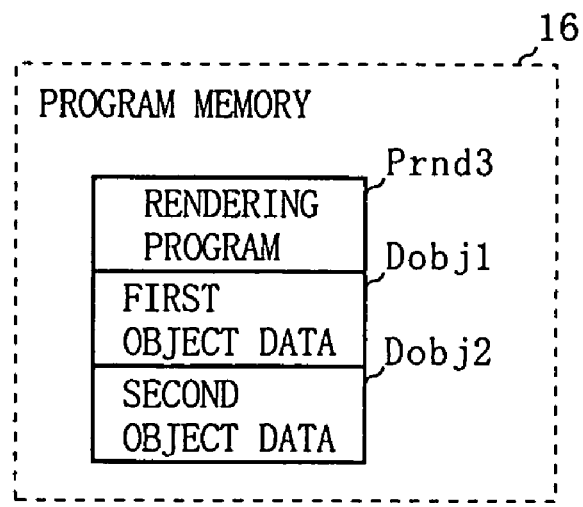
FIG. 25A is a diagram showing that program memory 16 of FIG. 24 stores a rendering program Prnd3, and first and second object data Dobj1 and Dobj2 therein.

The program memory 16 is typified by ROM (Read Only Memory), and as shown in FIG. 25A, stores a rendering program Prnd3. The program memory 16 also includes first and second object data Dobj1 and Dobj2, both of which are needed at time of executing the rendering program Prnd3.

Figure 25B:
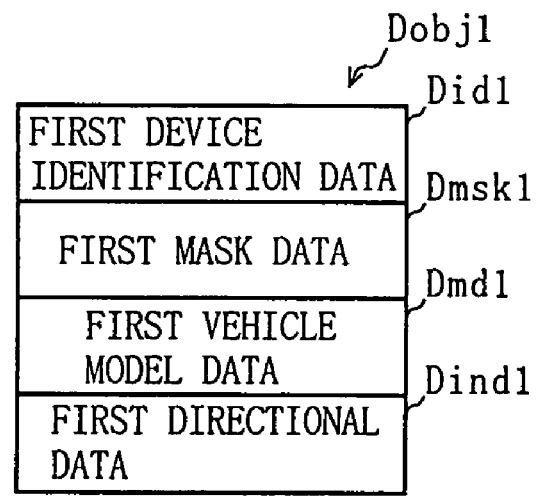
FIGS. 25B and 25C are diagrams showing, respectively, what are included in the first and second object data Dobj1 and Dobj2.
Figure 26A:
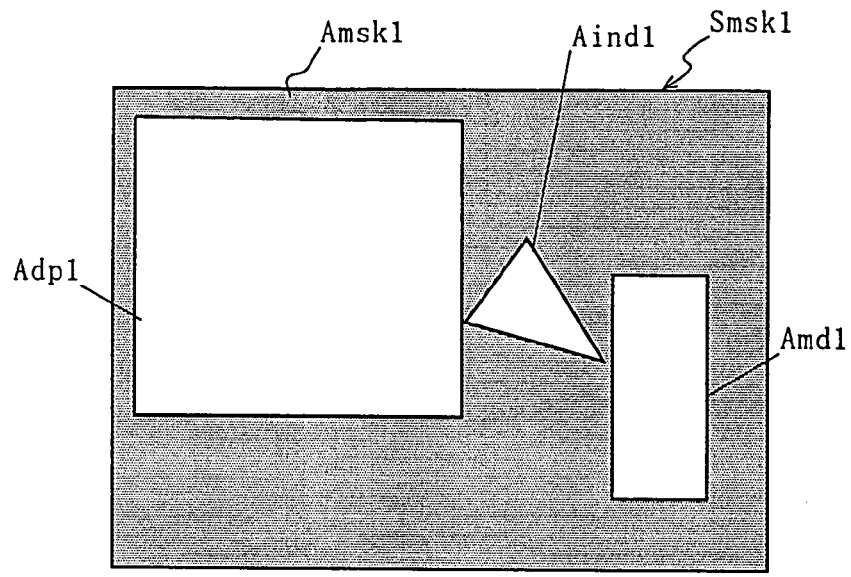
FIGS. 26A and 26B are diagrams both showing a first mask image Smsk1 represented by first mask data Dmsk1 of FIG. 25A.
Figure 26B:
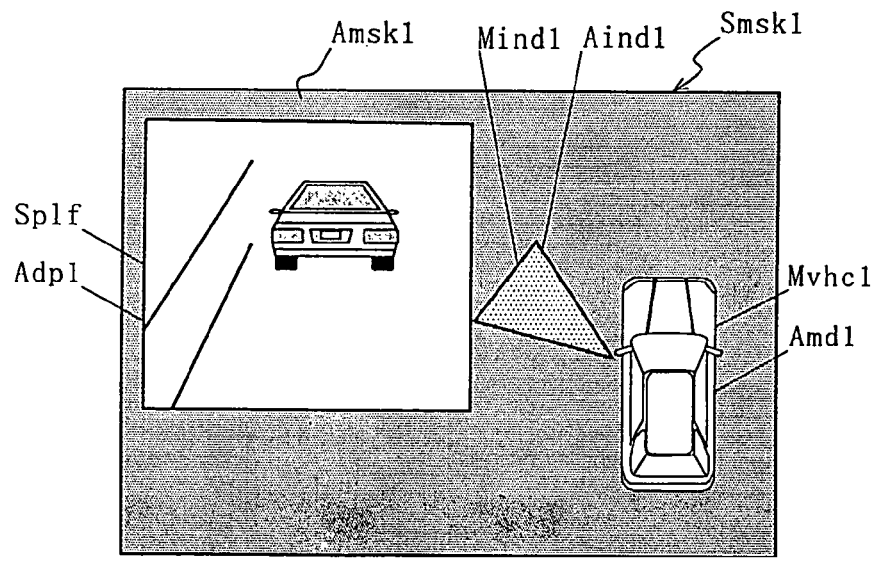

The first object data Dobj1 is used to generate a first display side image Sdp1, and as shown in FIG. 25B, composed of first device identification data Did1, first mask data Dmsk1, first vehicle model data Dmd1, and first directional data Dind1. Herein, the first device identification data Did1 indicates an identification number Nid1 previously assigned to an image capture device 18 for its identification. The first mask data Dmsk1 represents an image of such first mask region Amsk1 as shown in FIG. 16A by a hatched area (hereinafter, referred to as first mask image Smsk1). In detail, the first mask region Amsk1 is composed of a first display region Adp1, a first vehicle model overlay region Amd1, and a first indicator overlay region Aind1, which are all positionally predetermined. As shown in FIG. 26B, the first display region Adp1 is a region on which a partial left-front image Splf (described later) is overlaid, and presumably in this embodiment, occupies almost left side of the screen of the display device 23. The first vehicle model overlay region Amd1 is a region on which a first vehicle model image Mvhc1 (described later) is overlaid. In this embodiment, the location thereof is exemplarily the upper right of the screen of the display device 23. The first indicator overlay region Aind1 is a region on which a first indicator image Mind1 (described later) is overlaid, and in this embodiment, the location of which is exemplarily between the first display region Adp1 and the first vehicle model overlay region Amd1 on the screen of the display device 23.

The first vehicle model data Dmd1 represents, as shown in FIG. 26B, a vehicle's image viewed from the above (hereinafter, referred to as first vehicle model image Mvhc1). The first directional data Dind1 represents an indicator's image indicating which direction the partial left-front image Splf is now showing (such image is referred to as first indicator image Mind1). In this embodiment, the first indicator image Mind1 is in the shape of isosceles triangle (dotted part in FIG. 26B). More specifically, the isosceles triangle has a vertex pointing at a door mirror on the left of the first vehicle model image Mvhc1. Further, two sides of the isosceles triangle in the same length are extending towards the partial left-front image Splf.

Figure 25C:
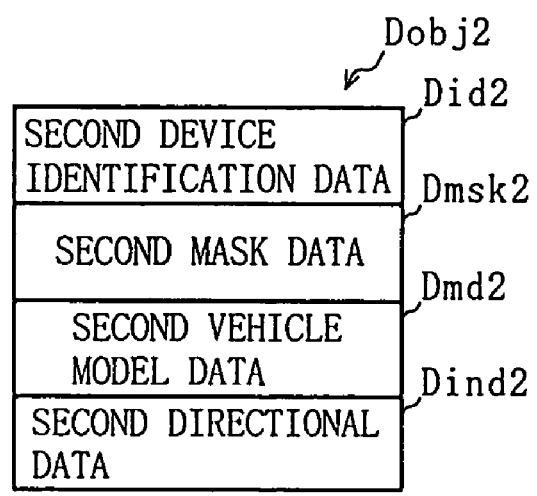
Figure 27A:
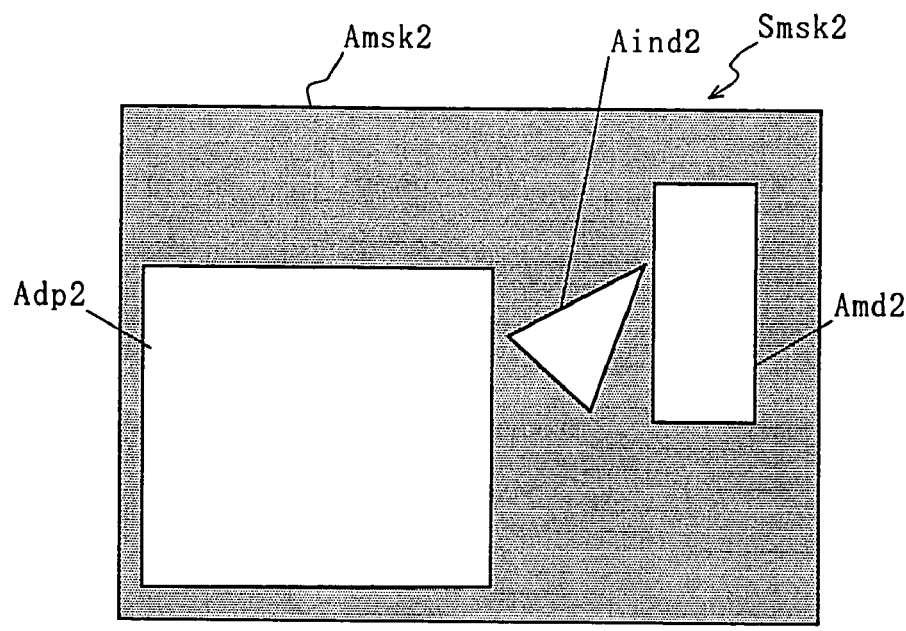
FIGS. 27A and 27B are diagrams both showing a second mask image Smsk2 represented by second mask data Dmsk2 of FIG. 25C.
Figure 27B:
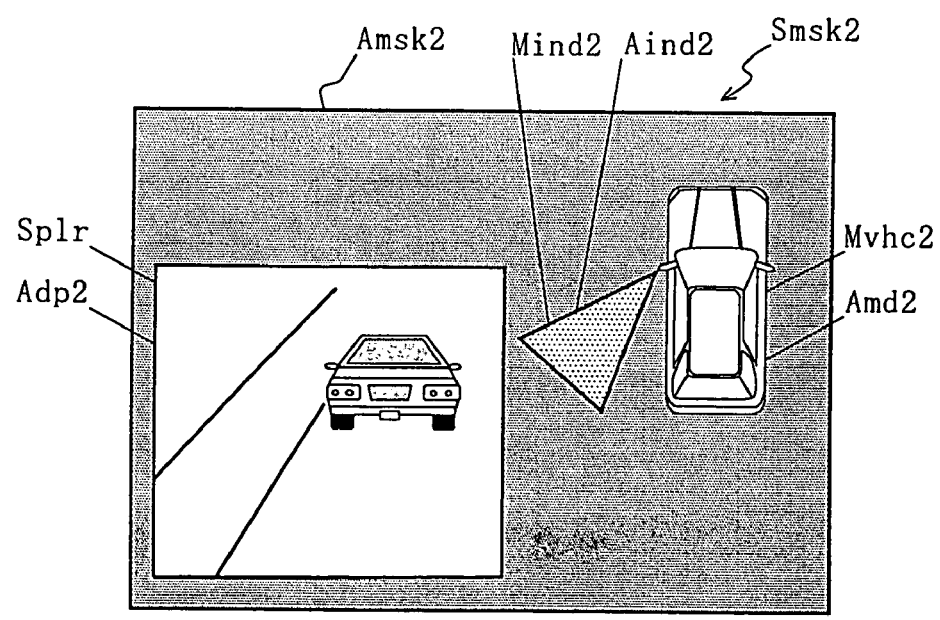

The second object data Dobj2 is used to generate a second display side image Sdp2, and as shown in FIG. 25C, composed of second device identification data Did2, second mask data Dmsk2, second vehicle model data Dmd2, and second directional data Dind2. Herein, the second device identification data Did2 indicates an identification number Nid2 previously assigned to an image capture device 19 for its identification. The second mask data Dmsk2 represents the second mask region Smsk2 as shown in FIG. 27A by a hatched area (hereinafter, referred to as second mask image Smsk1). In detail, the second mask region Amsk2 includes a second display region Adp2, a second vehicle model overlay region Amd2, and a second indicator overlay region Aind2, which are all positionally predetermined. As shown in FIG. 27B, the second display region Adp2 is a region on which the partial left-rear image Splr (described later) is overlaid, and presumably in this embodiment, occupies almost the left side of the screen of the display device 23. The second vehicle model overlay region Amd2 is a region on which a second vehicle model image Mvhc1 (described later) is overlaid. In this embodiment, the location thereof is exemplarily the lower right of the screen of the display device 23. The second indicator overlay region Aind2 is a region on which a second indicator image Mind2 (described later) is overlaid, and in this embodiment, the location of which is exemplarily between the second display region Adp2 and the second vehicle model overlay region Amd2 on the screen of the display device 23.

The second vehicle model data Dmd2 represents a second vehicle model image Mvhc2, which looks similar to the first vehicle model image Mvhc1 (see FIG. 27B). The second directional data Dind2 represents an indicator's image indicating which direction the partial left-rear image Splr is now showing (such image is referred to as second indicator image Mind2). In this embodiment, the second indicator image Mind2 is in the shape of isosceles triangle (dotted part in FIG. 27B). More specifically, the isosceles triangle has a vertex pointing at a door mirror on the left of the second vehicle model image Mvhc2. Further, two sides of the isosceles triangle in the same length are extending towards the partial left-rear image Splr.

Refer back to FIG. 24. The working area 17 is typified by RAM (Random Access Memory), and used when the processor 15 executes the rendering program Prnd3. The rendering device Urnd3 in such structure is typically included in a drive assistant device Uast3, and the processor 15 is communicably connected to the image capture devices 18 and 19, an input device 20, and the display device 23, all of which are included in the drive assistant device Uast3. Specifically, this drive assistant device Uast3 is mounted in a vehicle Vusr of FIG. 28, and therein, the image capture device 18 takes charge of the left-front side of the vehicle Vusr, and the image capture device 19 of the left-rear side thereof.

Figure 28:
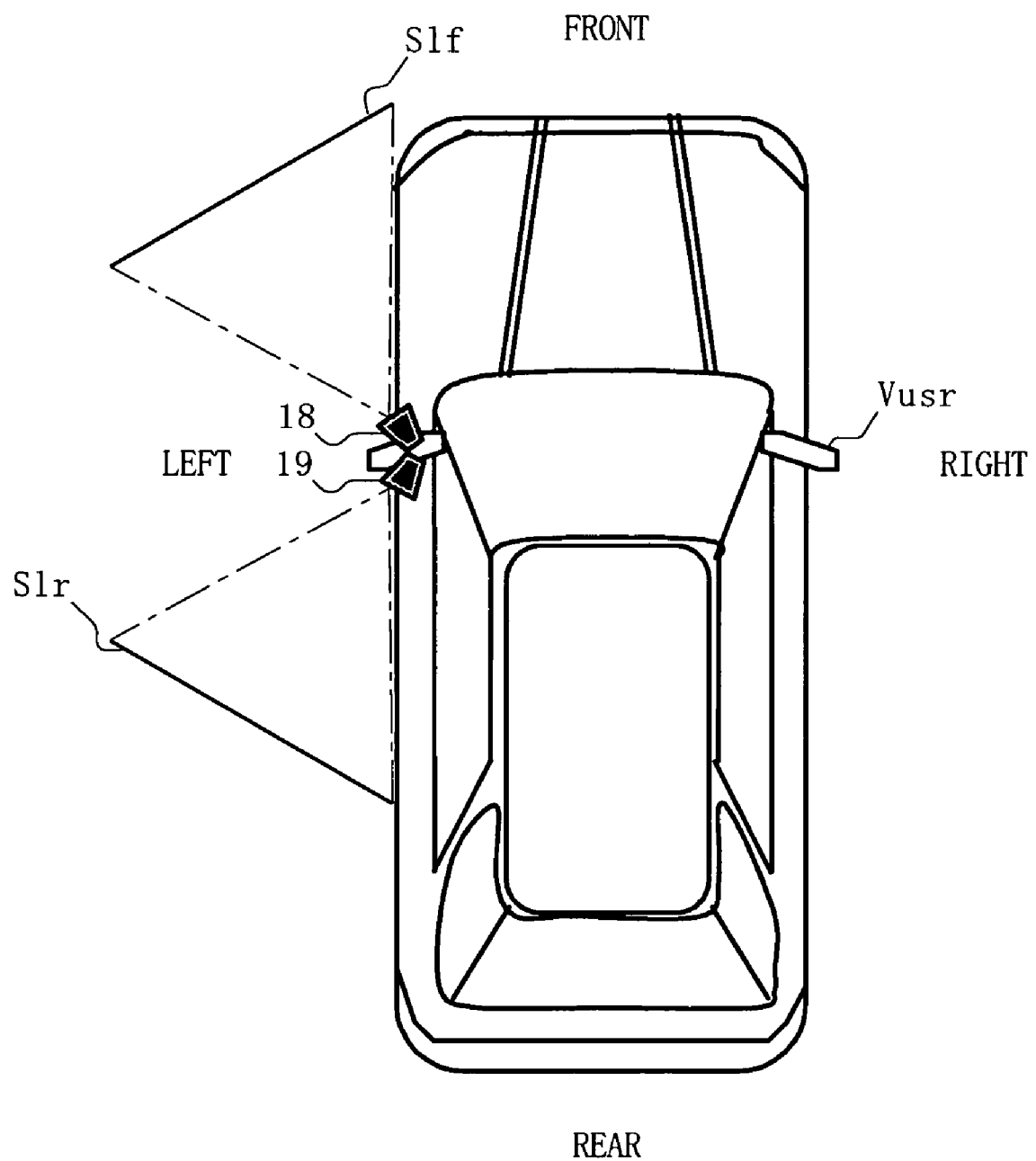
FIG. 28 is a schematic diagram exemplarily showing where image capture devices 18 and 19 of FIG. 24 are placed in the vehicle Vusr.

As shown in FIG. 28, the image capture device 18 is so placed on the left side of the vehicle Vusr as to be externally directed to the left-front side. More preferably, the image capture device 18 is so placed as to direct to the driver's blind region Alfb, which is indicated by a dotted line, when the driver is at the driver's seat. Here, captured by the image capture device 18 is a surrounding image of the vehicle Vusr, specifically, a left-front image Slf which indicates the blind region Alfb. Similarly, the image capture device 19 is so placed also on the left side of the vehicle Vusr but as to be externally directed to the left-rear side. More preferably, the image capture device 19 is so placed as to direct to the driver's blind region Alrb, which is indicated by a dotted line. Here, captured by the image capture device 19 is also a surrounding image of the vehicle Vusr, specifically, a left-front image Slr which indicates the blind region Alrb. Such image capture devices 18 and 19 are assigned each different identification numbers Nid1 and Nid2 to avoid confusion therebetween. Note that, the number of image capture devices provided to the drive assistant device Uast3 is not limited to those two, and may be more to cover the right-front, right-rear, front-right, and rear-right sides of the vehicle Vusr.

In FIG. 24, the input device 20 at least includes operation buttons 21 and 22. Pushing the operation button 21 starts a left-front monitor mode in response to an instruction signal Ilfm (step S42 in FIG. 29), and pushing the operation button 22 starts a left-rear monitor mode in response to an instruction signal Ilrm (step S44 in FIG. 29). Typically, the operation button 21 is pushed by the driver when he/she wants to know about the blind region Alfb, for example, when to park the vehicle Vusr (see FIG. 28). In response thereto, the input device 20 generates an instruction signal Ilfm for transmission to the processor 15 so as to instruct the processor 15 to start the left-front monitor mode. Here, the instruction signal Ilfm includes the above-described identification number Ndi1. On the other hand, the driver pushes the operation button 22 immediately before moving the vehicle Vusr backward. In response, the input device 20 generates an instruction signal Ilrm including the identification number Nid2 for transmission to the processor 15 so as to instruct the processor 15 to start the left-rear monitor mode.

Here, in FIG. 24, the display device 23 is typically a liquid crystal display, and displays on its screen the first and second display side images Sdp1 and Sdp2 generated by the processor 15.

Described next is the operation of such drive assistant device Uast3 with reference to FIGS. 29 to 31 for flowcharts. Once the drive assistant device Uast3 is turned ON, the processor 15 starts executing the rendering program Prnd3, and at the same time, reads the first and second object data Dobj1 and Dobj2 to the working area 17.

Figure 29:
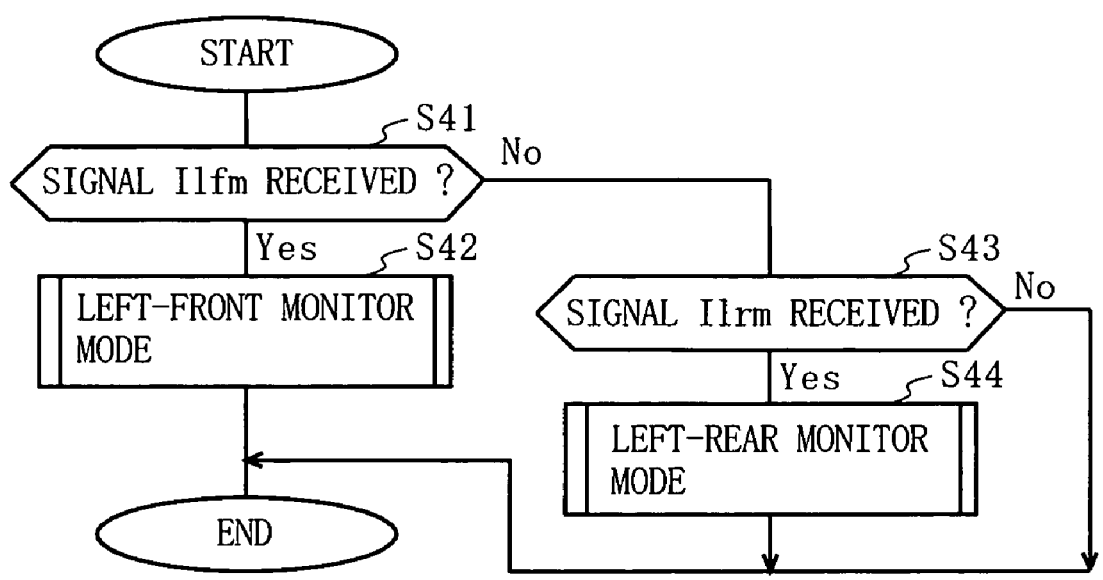
FIG. 29 is a main flowchart showing the operation of the drive assistant device Uast3 of FIG. 24.

If receiving any received signal, the processor 15 starts carrying out the processing of the main flowchart in FIG. 29. The processor 15 first determines whether the received signal is the instruction signal Ilfm (step S41). If determined Yes, the processor 15 executes the left-front monitor mode (step S42), otherwise the procedure goes to step S43, which will be described later.

Assume now that the driver needs to know in what state the left-front side of the vehicle Vusr is. In this case, the driver pushes the operation button 21, and the input device 20 responsively transmits the instruction signal Ilfm to the processor 15. The processor 15 then determines that the instruction signal Ilfm has been received in step S41, and thus carries out the left-front monitor mode. In the left-front monitor mode, the first display side image Sdp1 is generated for assisting the driver to drive, and the detailed procedure thereof is shown in FIG. 30.

Figure 30:
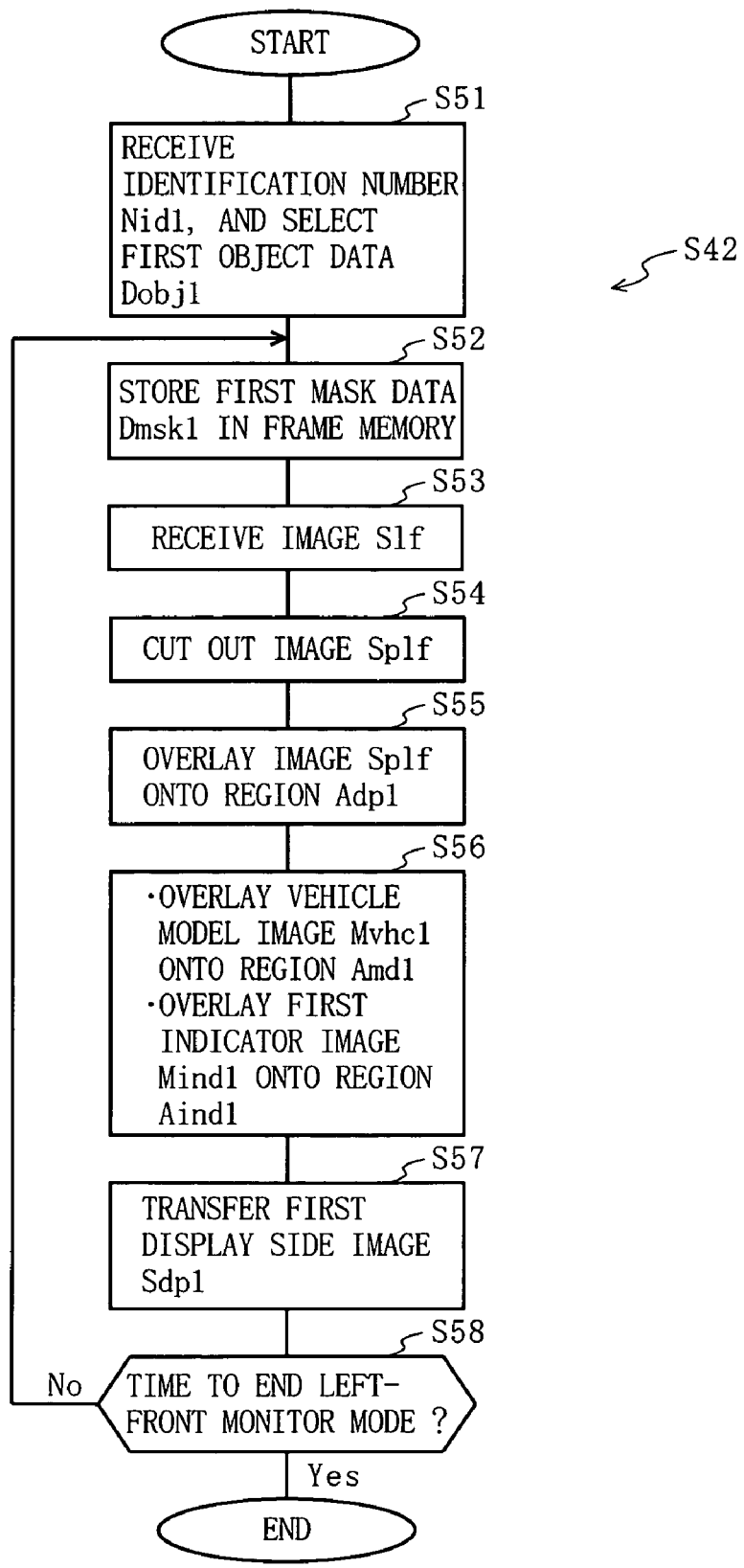
FIG. 30 is a flowchart showing the detailed procedure in step S42 in FIG. 29.

In FIG. 30, the processor 15 first extracts the identification number Nid1 from the received instruction signal Ilfm. Then, the processor 15 selects the first object data Dobj1 from the working area 3 (step S51). This is because the first object data Dobj1 is the one including the extracted identification number Nid1 as the first device identification data Did1. Thereafter, from the first object data Dobj1, the processor 15 extracts the first mask data Dmsk1, and stores it into frame memory (not shown) reserved in the working area 17 (step S52). After step S52 is through, generated on the frame memory is the first mask image Smsk1 (see FIG. 26A) only.

As the identification number Nid1 has been extracted, the processor 15 then instructs the applicable image capture device 18 to capture the left-front image Slf. The image capture device 18 responsively captures such left-front image Slf as shown in FIG. 32A, and stores it in the working area 17. As such, the processor 15 receives the left-front image Slf for the vehicle Vusr (step S53).

The processor 15 then cuts out such partial left-front image Splf as shown in FIG. 32B from the left-front image Slf received in step S53. Here, the partial left-front image Splf is an image overlaid onto the first display region Adp1 in the left-front image Slf (see FIG. 26A).

Then, on the frame memory, the processor 15 overlays thus cutout partial left-front image Splf onto the first display region Adp1 (step S55). After going through step S55, generated on the frame memory is an intermediate image, wherein the partial left-front image Splf is overlaid onto the first display region Adp1 in the first mask image Smsk1.

From the first object data Dobj1 selected in step S51, the processor 15 extracts the first vehicle model data Dmd1 and the first directional data Dind1. Then, on the intermediate image generated in step S55, the processor 15 overlays the first vehicle model image Mvhc1 represented by thus extracted first vehicle model data Dmd1 onto the first vehicle overlay region Amd1 in the first mask image Smsk1. Also, the processor 15 overlays the first indicator image Mind1 represented by the extracted first directional data Dind1 onto the first indicator region Aind1 in the first mask image Smsk1 (step S56). After going through step S56, generated on the frame memory is the first display side image Sdp1 wherein the partial left-front image Splf, the first vehicle model image Mvhc1, and the first indicator image Mind1 are overlaid on the first mask image Smsk1 (see FIG. 32C).

Thereafter, the processor 15 transfers the first display side image Sdp1 on the frame memory to the display device 23 (step S57). The display device 23 accordingly displays the first display side image Sdp1 on its screen.

The processor 15 then determines whether now is the time to end the left-front monitor mode (step S58). Here, to check when to end the left-front monitor mode, the same methods as those described for step S116 (see FIG. 8) can be applied. If determined not yet in step S58, the procedure returns to step S52 to generate a new first display side image Sdp1 by going through the same processing again. On the other hand, if determined Yes, this is the end of the processing in FIG. 30.

By displaying the driver such first display side image Sdp1 covering the driver's blind regions around the front-left side of the vehicle Vusr, the drive assistant device Uast3 assists the driver in driving. Here, as shown in FIG. 32C, displayed on the screen of the display device 23 are the partial left-front image Splf on the upper left, the first vehicle model image Mvhc1 on the lower right, and the isosceles-triangle shaped first indicator image Mind1 with a vertex pointing at the door mirror of the first vehicle model image Mvhc1. Here, two sides of the isosceles triangle in the same length are extending towards the partial left-front image Splf. Accordingly, in the case that the second display side image Sdp2 (described later) is available together with the first display side image Sdp1, the driver may not confuse therebetween. That is, with the first indicator image Sind1 displayed, the driver can instantaneously recognize the image he/she is now seeing covers the front-left side of the vehicle Vusr.

As already described, if the received signal is determined as not to be the instruction signal Ilfm in step S41 in FIG. 29, the processor 15 then sees if is the instruction signal Ilrm (step S43). If determined No, this is the end of the processing in FIG. 29. On the other hand, if determined Yes, the processor 15 executes the left-rear monitor mode (step S44).

Assume now that the driver moves the vehicle Vusr backward for parallel parking. In this case, the driver pushes the operation button 22, and the input device 20 responsively transmits the instruction signal Ilrm to the processor 15. The processor 15 then determines that the instruction signal Ilrm has been received in step S43, and thus carries out the left-rear monitor mode. In the rear-left monitor mode, the second display side image Sdp2 is generated for assisting the driver to drive, and the detailed procedure thereof is shown in FIG. 31.

Figure 31:
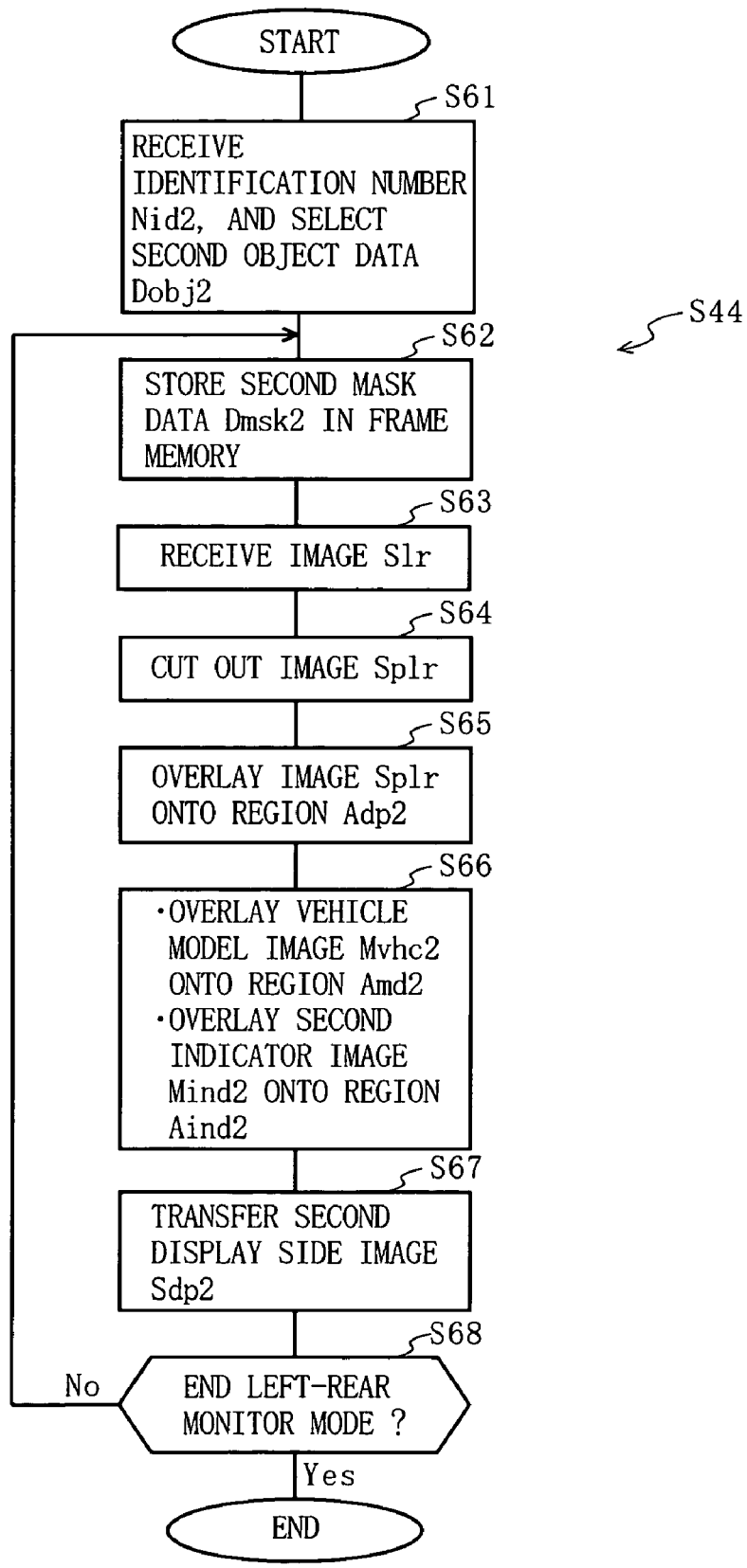
FIG. 31 is a flowchart showing the detailed procedure in step S44 in FIG. 29.

In FIG. 31, the processor 15 first extracts the identification number Nid2 from the received instruction signal Ilrm. Then, the processor 15 selects the second object data Dobj2 from the working area 17 (step S61). This is because the second object data Dobj2 is the one including the extracted identification number Nid2 as the second device identification data Did2. Thereafter, from the second object data Dobj2, the processor 15 extracts the second mask data Dmsk2 for storage into frame memory (not shown) reserved in the working area 17 (step S62). After step S62 is through, generated on the frame memory is the second mask image Smsk2 (see FIG. 27A) only.

As the identification number Nid2 has been extracted, the processor 15 then instructs the applicable image capture device 19 to capture the left-rear image Slr. The image capture device 19 responsively captures such left-rear image Slr as shown in FIG. 33A for storage in the working area 17. As such, the processor 15 receives the left-rear image Slr for the vehicle Vusr (step S63).

The processor 15 then cuts out such partial left-rear image Splr as shown in FIG. 33B from the left-rear image Slr received in step S63. Here, the partial left-rear image Splr is a part supposedly overlaid onto the second display region Adp2 in the left-rear image Slr (see FIG. 27A).

Then, on the frame memory, the processor 15 overlays thus cutout partial left-rear image Splr onto the second display region Adp2 (step S65). After going through step S65, generated on the frame memory is an intermediate image, wherein the partial left-rear image Splr is overlaid onto the second display region Adp2 in the second mask image Smsk2.

From the second object data Dobj2 selected in step S61, the processor 15 extracts the second vehicle model data Dmd2 and the second directional data Dind2. Then, the processor 15 overlays the second vehicle model image Mvhc2 represented by thus extracted second vehicle model data Dmd2 onto the second vehicle overlay region Amd2 in the second mask image Smsk2. Also, the processor 15 overlays the first indicator image Mind1 represented by the extracted first directional data Dind1 onto the first indicator region Aind1 in the first mask image Smsk1 (step S66). After going through step S66, generated on the frame memory is the second display side image Sdp2 as shown in FIG. 33C.

Thereafter, the processor 15 transfers the second display side image Sdp2 on the frame memory to the display device 23 (step S67). The display device 23 accordingly displays the second display side image Sdp2 on its screen. The processor 15 then determines whether now is the time to end the left-rear monitor mode in the same manner as in step S58 (step S68). If determined not yet in step S68, the procedure returns to step S62 to generate a new second display side image Sdp2 by going through the same processing again. On the other hand, if determined Yes in step S68, this is the end of the processing in FIG. 31.

By displaying the driver such second display side image Sdp2 covering the driver's blind regions around the left-rear side of the vehicle Vusr, the drive assistant device Uast3 assists the driver in driving. Here, as shown in FIG. 33C, displayed on the screen of the display device 23 are the partial left-rear image Splr on the lower left, the second vehicle model image Mvhc2 on the upper right, and the isosceles-triangle shaped second indicator image Mind2 with a vertex pointing at the door mirror of the second vehicle model image Mvhc2. Here, two sides of the isosceles triangle in the same length are extending towards the partial left-rear image Splf. Accordingly, in the case that the second display side image Sdp2 is available together with the first display side image Sdp1, the driver may not confuse therebetween. That is, with the second indicator image Sind2 displayed, the driver can instantaneously recognize the image he/she is now seeing covers the left-rear side of the vehicle Vusr.

Note here that, the first indicator image Mind1 is in the shape of isosceles triangle. This is not restrictive, and any image in some other shape will work just fine as long as sufficiently indicates which side of the vehicle Vusr the partial left-front image Splr is showing. This is also applicable to the second indicator image Mind2.

Figure 34:
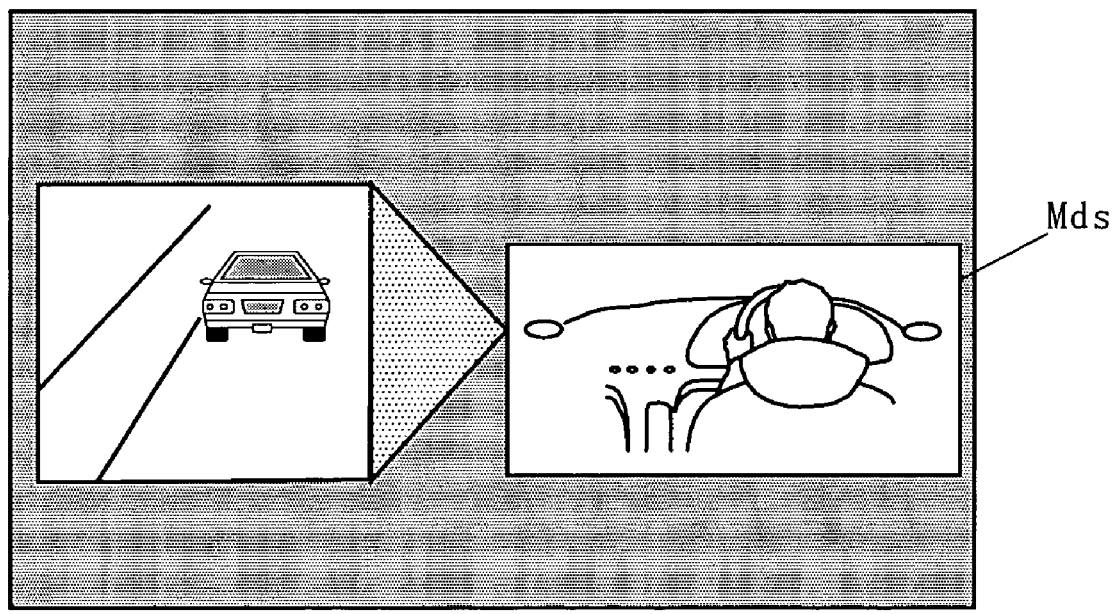
FIG. 34 is a diagram showing exemplary alternative data to the vehicle model data Dmd1 of FIG. 25B.
Figure 35:
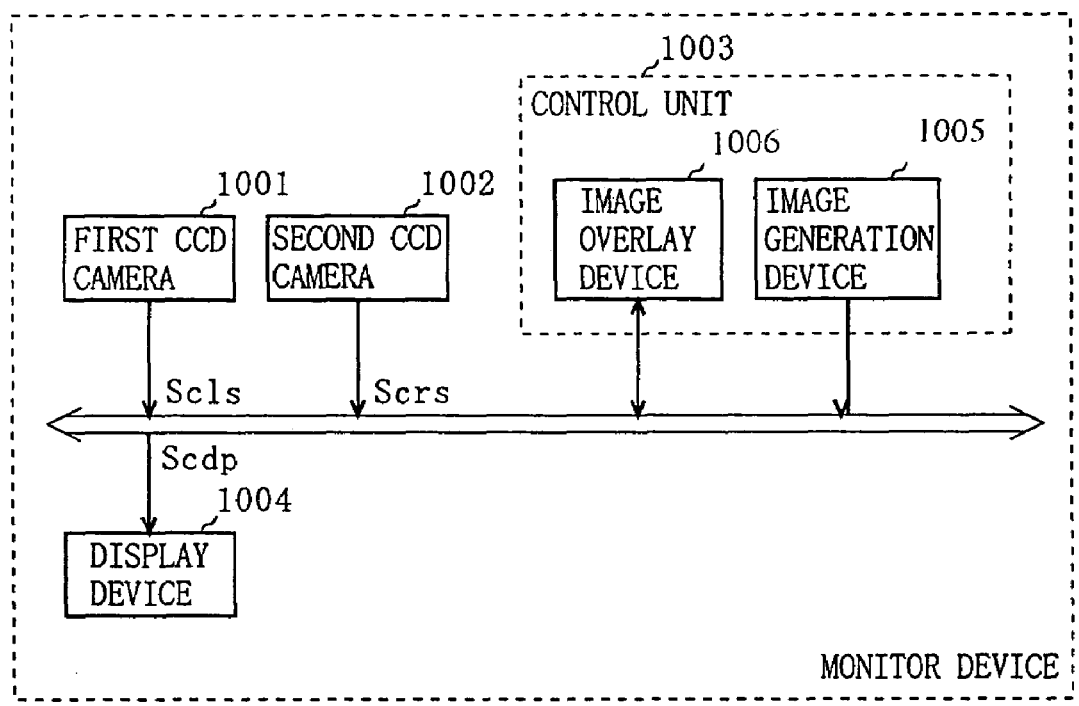
FIG. 35 is a block diagram showing the entire structure of a monitor device for vehicle, which is a conventional rendering device.
Figure 36:
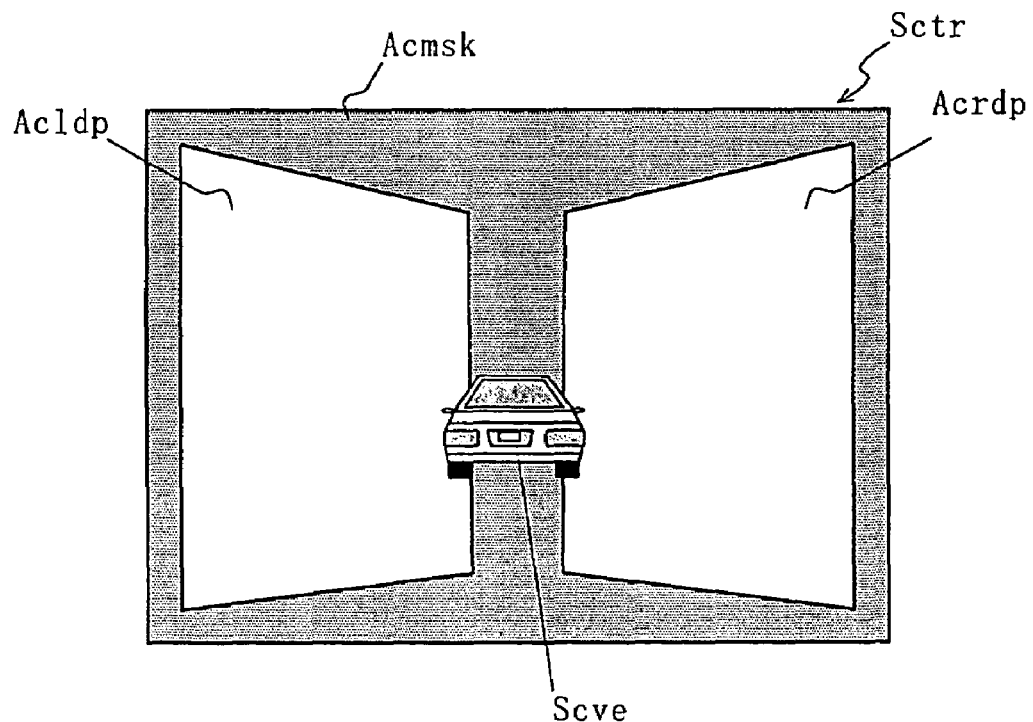
FIG. 36 is a diagram showing a trimming image Sctr and a vehicle image Scve displayed on a display device 1004 of FIG. 35.

In the above, the first object data Dobj1 includes the vehicle model data Dmd1. This is not restrictive, and the first object data Dobj1 may include data representing such vehicle model image Mds as shown in FIG. 34, that is, a rear view of around the driver's seat. This is also applicable to the second object data Dobj2.

Also, for convenience, the drive assistant device Uast3 displays the driver the left-front and left-rear sides of the vehicle Vusr in the above. Here, in the same manner applied to the display side image Sdp1, the drive assistant device Dast3 may generate an image showing the driver the right-front, right-rear, front-left, front-right, rear-left, and rear-right sides of the vehicle Vusr.

In the above embodiments, the rendering programs Prnd1 to Prnd3 are stored in the rendering device Urnd1 to Urnd3, respectively. This is not restrictive, and those programs Prnd1 to Prnd3 may be distributed in a recording medium typified by CD-ROM, or over a communications network such as the Internet.

While the invention has been described in detail, the foregoing description is in all aspects illustrative and not restrictive. It is understood that numerous other modifications and variations can be devised without departing from the scope of the invention.

What is claimed is:

1. A rendering device for generating a display image for drive assistance, said device comprising:
   a reception part for receiving, from an image capture device of a vehicle, a surrounding image, which covers an area around the vehicle;
   a storing part for storing indicator images, which are different from each other in size;
   a counting part;
   a selecting part for selecting, based on a counter value of said counting part, one of the indicator images stored in said storing part, and
   a first image overlay part for overlaying the indicator image selected by said selecting part on any one of predetermined points, which are different from each other in position in the surrounding image received by said reception part, to provide a generation of the display image that indicates which portion of the area surrounding the vehicle is represented by the surrounding image with reference to the vehicle,
   wherein said counting part counts a number of generations of the display image provided by said first image overlay part.

2. The rendering device according to claim 1, further comprising:
   a cutout part for cutting out, as a partial surrounding image, a predetermined region from the surrounding image received by said reception part; and
   a second image overlay part for generating an intermediate image by overlaying, onto a prepared mask region, the cutout partial surrounding image cutout
   wherein said first image overlay part is operable to overlay the indicator image onto the intermediate image generated by said second image overlay part.

3. The rendering device according to claim 1, wherein said indicator images are in the shape of a vehicle model, and
   wherein said first image overlay part is operable to overlay each of the indicator onto the surrounding image in such a manner as to create a moving picture of the vehicle.

4. The rendering device according to claim 3, wherein each of said indicator images is in the shape of the vehicle model as viewed from behind.

5. The rendering device according to claim 1, wherein each of said indicator images is in a graphic form, and
   wherein said first image overlay part is operable to overlay each of the indicator images in such manner as to create a moving picture of the graphics.

6. The rendering device according to claim 1, wherein
   in response to a signal received from a first operation button, said reception part receives, from an image capture device placed on the front side of the vehicle, a front image as the surrounding image of the vehicle,
   said first image overlay part is operable to generate a display front image wherein each of the indicator images is overlaid on the front image to indicate that the front portion of the area surrounding the vehicle is represented by the surrounding image,
   in response to a signal received from a second operation button, said reception part receives, from an image capture device placed on the rear side of the vehicle, a rear image as the surrounding image of the vehicle, and
   said first image overlay part is operable to generate a display rear image wherein each of the indicator images is overlaid on the rear image to indicate that the rear portion of the area surrounding the vehicle is represented by the surrounding image.

7. The rendering device according to claim 6,
   wherein each of said indicator images is in the shape of the vehicle model as viewed from behind,
   said first image overlay part is operable to overlay each of the indicator images on the surrounding image in such manner as to create a moving picture of the vehicle model, and
   said first image overlay part is operable to overlay each of the indicator images on the surrounding image in such manner as to create a moving picture of the vehicle model.

8. The rendering device according to claim 1, wherein
when a signal is received from an operation button, and when it is detected that the vehicle is moving forward said reception part receives a front image from an image capture device on the front side of the vehicle as the surrounding image of the vehicle, said first image overlay part is operable to generate a display front image wherein each of the indicator images is overlaid on the front image to indicate that the front portion of the area surrounding the vehicle is represented by the surrounding image, when a signal is received from the operation button, and when it is detected that the vehicle is moving backward said reception part receives a rear image from an image capture device on the rear side of the vehicle as the surrounding image of the vehicle, said first image overlay part is operable to generate a display rear image wherein each of the indicator images is overlaid on the rear image to indicate that the rear portion of the area surrounding the vehicle is represented by the surrounding image.

9. The rendering device according to claim 8, wherein each of the indicator images is in the shape of a vehicle model as viewed from behind, said first image overlay part is operable to overlay, in response to a signal from the operation button and a signal indicating that the vehicle is moving forward, each of the indicator images on the surrounding image in such manner as to create a moving picture of the vehicle model moving upward, and said first image overlay part is operable to overlay, in response to a signal from the operation button and a signal indicating that the vehicle is moving backward, each of the indicator images on the surrounding image in such manner as to create a moving picture of the vehicle model moving downward.

10. A rendering method of generating a display image for assisting a driver of a vehicle in driving, said method comprising:

storing indicator images, which are different from each other in size, receiving, from an image capture device of a vehicle, a surrounding image which covers an area surrounding the vehicle;

counting a number;

selecting, based on the counted number, one of the stored indicator images, and overlaying the selected indicator image on any one of predetermined points, which are different from each other in position in the received surrounding image, to provide a generation of the display image that indicates which portion of the area surrounding the vehicle is represented by the surrounding image with reference to the vehicle, wherein said counting comprises counting a number of generations of the display image provided by said overlaying.

11. A recording medium having system readable instructions recorded thereon, the system readable instructions being capable of instructing a display system to generate a display image for assisting a driver of a vehicle in driving, said system readable instructions being capable of instructing the system to:

store indicator images, which are different from each other in size;

receive, from an image capture device of a vehicle, a surrounding image which covers an area surrounding the vehicle;

count a number;

select, based on the counted number, one of the stored indicator images; and overlay the selected indicator image on any one of predetermined points, which are different from each other in position in the received surrounding image to provide a generation of the display image that indicates which portion of the area surrounding the vehicle is represented by the surrounding image with reference to the vehicle, wherein the instructions capable of instructing the system to count comprise instructions capable of instructing the system to count a number of generations of the display image provided where the system overlays.

12. A rendering program for generating a display image for assisting a driver of a vehicle in driving, said program comprising:

storing indicator images, which are different from each other in size;

receiving, from an image capture device of a vehicle, a surrounding image which covers an area surrounding the vehicle;

counting a number;

selecting, based on the counted number, one of the stored indicator images, and overlaying the selected indicator image on any one of predetermined points, which are different from each other in position in the received surrounding image, to provide a generation of the display image that indicates which portion of the area surrounding the vehicle is represented by the surrounding image with reference to the vehicle, wherein said counting comprises counting a number of generations of the display image provided by said overlaying.

* * * * *